(12) United States Patent
Kasar et al.

(10) Patent No.: US 11,810,714 B2
(45) Date of Patent: Nov. 7, 2023

(54) HEADBAND FOR HEAD-MOUNTED DEVICE

(71) Applicant: Apple Inc., Cupertino, CA (US)

(72) Inventors: Darshan R. Kasar, San Francisco, CA (US); Javier Mendez, San Jose, CA (US); Nicholas C. Soldner, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 26 days.

(21) Appl. No.: 17/160,430

(22) Filed: Jan. 28, 2021

(65) Prior Publication Data

US 2021/0304938 A1    Sep. 30, 2021

Related U.S. Application Data

(60) Provisional application No. 62/994,414, filed on Mar. 25, 2020.

(51) Int. Cl.

| | |
|---|---|
| *H01F 7/06* | (2006.01) |
| *F16M 13/04* | (2006.01) |
| *H01F 7/02* | (2006.01) |
| *H01F 7/20* | (2006.01) |
| *G06F 1/16* | (2006.01) |

(52) U.S. Cl.
CPC ............ *H01F 7/064* (2013.01); *F16M 13/04* (2013.01); *H01F 7/02* (2013.01); *H01F 7/20* (2013.01); *G06F 1/163* (2013.01)

(58) Field of Classification Search
None
See application file for complete search history.

(56) References Cited

U.S. PATENT DOCUMENTS

| | | | |
|---|---|---|---|
| 6,253,826 B1* | 7/2001 | Witter | E06B 3/481 |
| | | | 160/DIG. 16 |
| 7,517,222 B2 | 4/2009 | Rohrbach et al. | |
| 10,321,751 B1 | 6/2019 | Magrath | |
| 10,326,235 B2 | 6/2019 | Devoe | |
| 10,640,895 B1* | 5/2020 | Camp | H01H 13/85 |
| 10,663,737 B1 | 5/2020 | Magrath et al. | |

(Continued)

FOREIGN PATENT DOCUMENTS

| | | |
|---|---|---|
| CN | 105892065 B | 8/2018 |
| CN | 110308558 A | 10/2019 |
| WO | 2017004695 A1 | 1/2017 |

*Primary Examiner* — Stephen W Jackson
(74) *Attorney, Agent, or Firm* — Young Basile Hanlon & MacFarlane, P.C.

(57) ABSTRACT

A head-mounted device includes a device housing, a display device, an optical system, and a headband. The head-mounted device also includes a first headband connector that includes a headband-side connector portion that is connected to the headband at a first end of the headband and a device-side connector portion that is connected to the device housing. The first headband connector is movable between a disconnected position, in which the headband-side connector portion is disconnected from the device-side connector portion, and a connected position, in which the headband-side connector portion is connected to the device-side connector portion. The first headband connector also includes paired magnetic components that are configured to attract the headband-side connector portion and the device-side connector portion to one another to urge the first headband connector to move to the connected position.

33 Claims, 13 Drawing Sheets

(56) References Cited

U.S. PATENT DOCUMENTS

| | | | |
|---|---|---|---|
| 11,036,054 B2* | 6/2021 | Poore | G06F 3/012 |
| 2016/0085278 A1* | 3/2016 | Osterhout | G06F 1/206 |
| | | | 361/679.03 |
| 2018/0197500 A1* | 7/2018 | Patel | G06F 3/147 |
| 2019/0159354 A1* | 5/2019 | Zheng | A42B 1/24 |
| 2019/0387299 A1 | 12/2019 | Evans et al. | |
| 2020/0026088 A1 | 1/2020 | Tzvieli et al. | |
| 2020/0081490 A1 | 3/2020 | Rothkopf et al. | |
| 2021/0080746 A1* | 3/2021 | Mirabella | G02B 7/002 |

* cited by examiner

HEADBAND FOR HEAD-MOUNTED DEVICE

CROSS-REFERENCE TO RELATED APPLICATIONS

This application claims the benefit of U.S. Provisional Application No. 62/994,414, filed on Mar. 25, 2020, the content of which is hereby incorporated by reference in its entirety for all purposes.

FIELD

The present disclosure relates generally to the field of head-mounted devices.

BACKGROUND

Head-mounted devices that display computer-generated reality content may include a housing and a structure that allows the housing to be held in place near the eyes of the user. One example of such a structure is a headband.

SUMMARY

One aspect of the disclosure is a head-mounted device that includes a device housing, a display device that is connected to the device housing to display content to a user as emitted light, an optical system that is configured to direct the emitted light to a user's eyes, and a headband that has a first end and a second end and is configured to support the device housing with respect to the user's head. The head-mounted device also includes a first headband connector that includes a headband-side connector portion that is connected to the headband at a first end of the headband and a device-side connector portion that is connected to the device housing. The first headband connector is movable between a disconnected position, in which the headband-side connector portion is disconnected from the device-side connector portion, and a connected position, in which the headband-side connector portion is connected to the device-side connector portion. The first headband connector also includes paired magnetic components that are configured to attract the headband-side connector portion and the device-side connector portion to one another to urge the first headband connector to move to the connected position.

In some implementations, the paired magnetic components include a permanent magnet and a ferromagnetic structure. In some implementations, the paired magnetic components include a first permanent magnet that is located on the headband-side connector portion and a second permanent magnet that is located on the device-side connector portion.

In some implementations, the first headband connector includes an electrical power connection. In some implementations, the first headband connector includes a communications signal connection.

In some implementations, the head-mounted device also includes a second headband connector that includes a headband-side connector portion that is connected to the headband at a second end of the headband and a device-side connector portion that is connected to the device housing. In some implementations, the head-mounted device also a second headband connector that is directly connected to the device housing and is non-releasable with respect to the device housing.

In some implementations, the head-mounted device also includes an additional headband connector that is located along the headband and is movable between a connected position and a disconnected position.

In some implementations of the head-mounted device, the paired magnetic components include an electromagnet that is operable to generate a magnetic attraction force and application of the magnetic attraction force ceases in response to determining that a current draw by the electromagnet is greater than a threshold value.

Another aspect of the disclosure is a head-mounted device that includes a device housing, a display device that is connected to the device housing to display content to a user as emitted light, an optical system that is configured to direct the emitted light to a user's eyes, and a headband that has a first end and a second end and is configured to support the device housing with respect to the user's head. The head-mounted device also includes a first headband connector that includes a headband-side connector portion that is connected to the headband at a first end of the headband and a device-side connector portion that is connected to the device housing. The first headband connector includes an electromagnet. The first headband connector is movable between a disconnected position, in which the headband-side connector portion is disconnected from the device-side connector portion, and a connected position, in which the headband-side connector portion is connected to the device-side connector portion. The head-mounted device also includes a release button that is operable to change operation of the electromagnet to cause the first headband connector to move from the connected position to the disconnected position.

In some implementations, the release button is located on the headband at a location that is spaced from the first headband connector.

In some implementations, the head-mounted device also includes a power source that is located on the headband and is operable to supply electrical power to the electromagnet.

In some implementations, the electromagnet is operable to apply a magnetic attraction force to maintain the first headband connector in the connected position.

In some implementations, the release button, when operated by the user, causes the electromagnet to cease application of the magnetic attraction force to cause the first headband connector to move from the connected position to the disconnected position.

In some implementations, the first headband connector includes paired magnetic components that are configured to maintain the first headband connector in the connected position when the electromagnet is not operated and the electromagnet is operable to apply a magnetic repulsion force to move the first headband connector from the connected position to the disconnected position when the electromagnet is operated.

In some implementations, the release button, when operated by the user, causes the electromagnet to apply the magnetic repulsion force to cause the first headband connector to move from the connected position to the disconnected position.

Another aspect of the disclosure is a head-mounted device that includes a device housing, a display device that is connected to the device housing to display content to a user as emitted light, an optical system that is configured to direct the emitted light to a user's eyes, and a headband that has a first end and a second end and is configured to support the device housing with respect to the user's head. The head-mounted device also includes a headband adjustment device that is connected to the headband and includes adjuster portions, wherein the headband adjustment device is able to contract and expand a length of the headband by moving the adjuster portions with respect to one another.

In some implementations, the adjuster portions are connected to one another by connecting structures that allow adjacent ones of the adjuster portions to move toward each other and away from each other.

In some implementations, the headband adjustment device includes biasing structures that urge adjacent ones of the adjuster portions to move at least one of toward each other or away from each other.

In some implementations, a first pair of adjuster portions are related to one another by an electromagnetic device that is controllable to cause the first pair of adjuster portions to move at least one of toward each other or away from each other.

In some implementations, the head-mounted device include a sensor that outputs a signal that represents a magnitude of motion, wherein a magnitude of tension applied to the headband by the headband adjustment device is controlled according to the signal.

Another aspect of the disclosure is a head-mounted device that includes a device housing, a display device that is connected to the device housing to display content to a user as emitted light, an optical system that is configured to direct the emitted light to a user's eyes, a headband that has a first end and a second end and is configured to support the device housing with respect to the user's head, an accessory component, and an accessory adjustment device. The accessory adjustment device is connected to the headband, supports the accessory component with respect to the headband, and includes a first end portion that is connected to the headband, a second end portion that is connected to the headband, an adjuster portion, and an electromagnetic device, wherein the electromagnetic device is operable to move the adjuster portion between the first end portion and the second end portion to change a location of the accessory component with respect to the headband.

In some implementations, the adjuster portion is connected to the first end portion and the second end portion by connecting structures that allow the adjuster portion to move between the first end portion and the second end portion.

In some implementations, the accessory component is a loudspeaker.

DETAILED DESCRIPTION

The disclosure herein relates to head-mounted devices that are used to show computer-generated reality (CGR) content to users.

In some of the implementations that are described herein, a head-mounted device includes a headband connector is movable between a connected positioned and a disconnected position to detach either one end of the headband or both ends of the headband from a device housing of the head-mounted device. This arrangement makes it easier and more convenient for the user to put the device on their head and to remove it. Specific implementations that are described herein also improve packaging in the connector area. Specific implementations also include connectors that use magnets and/or electromagnets to make use easier and more convenient.

Some of the implementations that are described herein include a headband adjustment structure that is able to adjust tightness of the headband using electromagnetic adjustment devices. Some of the implementations that are described herein include a headband adjustment structure that is able to adjust the position of an accessory component relative to the headband using electromagnetic adjustment devices. As examples, the accessory component may be a loudspeaker or a health-monitoring device.

Figure 1:
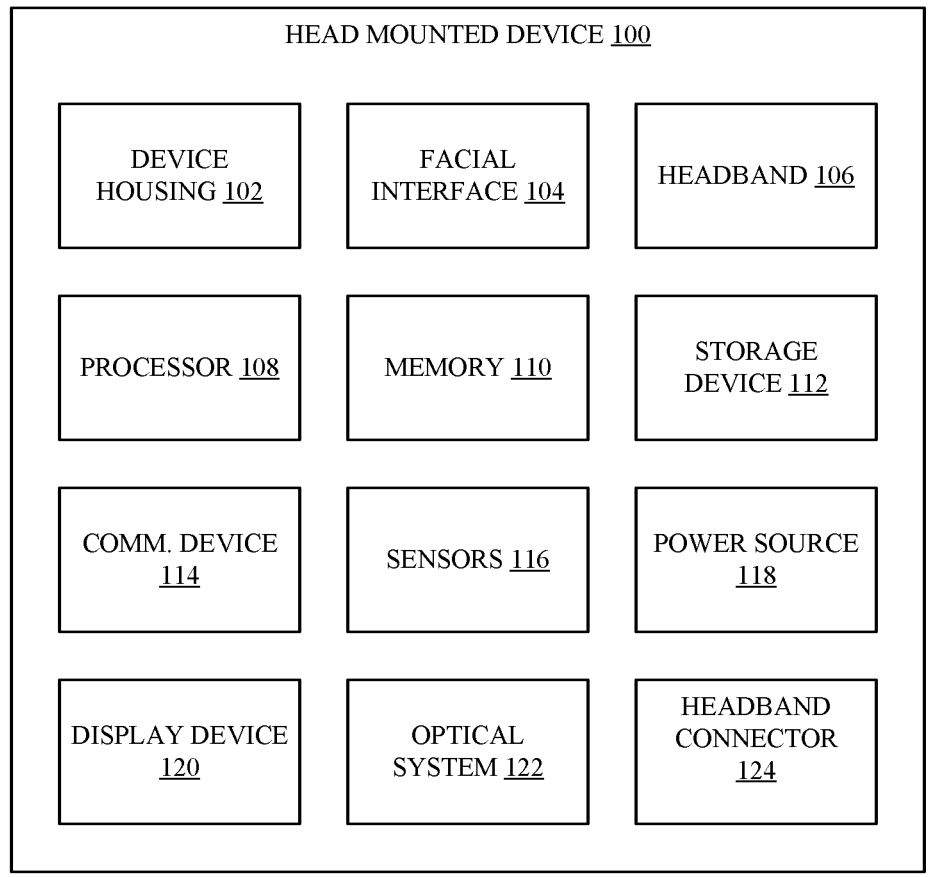
FIG. 1 is a block diagram that shows an example of a hardware configuration for a head-mounted device.

FIG. 1 is a block diagram that shows an example of a hardware configuration for a head-mounted device 100. The head-mounted device 100 is intended to be worn on the head of a user and includes components that are configured to display content to the user. Components that are included in the head-mounted device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

In the illustrated example, the head-mounted device 100 includes a device housing 102, a facial interface 104, a headband 106, a processor 108, a memory 110, a storage device 112, a communications device 114, sensors 116, a power source 118, a display device 120, an optical system 122, a first headband connector 124, and a second headband connector 125.

In some implementations of the head-mounted device 100, some or all of these components may be included in a separate device that is removable. For example, any or all of the processor 108, the memory 110, and/or the storage device 112, the communications device 114, the sensors 116, the power source 118, and the display device 120 may be incorporated in a device such as a smart phone that is connected (e.g., by docking) to the other portions of the head-mounted device 100.

In some implementations of the head-mounted device 100, the processor 108, the memory 110, and/or the storage device 112 are omitted, and the corresponding functions are performed by an external device that communicates with the head-mounted device 100. In such an implementation, the head-mounted device 100 may include components that support a data transfer connection with the external device using a wired connection or a wireless connection that is established using the communications device 114.

The device housing 102 is a structure that supports various other components that are included in the head-mounted device. The device housing 102 may have a size and shape that corresponds generally to the width of an average person's head. The device housing 102 may have a height that corresponds generally to the distance between an average person's forehead and cheek bones such that it extends above and below the average person's orbital cavities. In one implementation, the device housing 102 may be a frame that other components of the head-mounted device are connected to. In some implementations, the device housing 102 may be an enclosed structure such that certain components of the head-mounted device 100 are contained within the device housing 102 and thereby protected from damage. In some implementations, the device housing 102 may be an eyeglasses style frame.

The facial interface 104 is connected to the device housing 102 and is located at areas around a periphery of the device housing 102 where contact with the user's face is likely. The facial interface 104 functions to conform to portions of the user's face to allow the headband 106 to be tensioned to an extent that will restrain motion of the device housing 102 with respect to the user's head. The facial interface 104 may also function to reduce the amount of light from the physical environment around the user that reaches the user's eyes. The facial interface 104 may contact areas of the user's face, such as the user's forehead, temples, and cheeks. The facial interface 104 may be formed from a compressible material, such as open-cell foam or closed cell foam. In some implementations, the facial interface 104 is omitted from the head-mounted device 100, such as when the head-mounted device 100 is implemented using an eyeglasses-type configuration.

The headband 106 is connected to the device housing 102. The headband 106 is a component or collection of components that function to secure the device housing 102 in place with respect to the user's head so that the device housing 102 is restrained from moving with respect to the user's head and maintains a comfortable position during use. The headband 106 can be implemented using rigid structures, elastic flexible straps, or inelastic flexible straps.

The processor 108 is a device that is operable to execute computer program instructions and is operable to perform operations that are described by the computer program instructions. The processor 108 may be implemented using one or more conventional devices and/or more or more special-purpose devices. As examples, the processor 108 may be implemented using one or more central processing units, one or more graphics processing units, one or more application specific integrated circuits, and/or one or more field programmable gate arrays. The processor 108 may be provided with computer-executable instructions that cause the processor 108 to perform specific functions. The memory 110 may be one or more volatile, high-speed, short-term information storage devices such as random-access memory modules.

The storage device 112 is intended to allow for long term storage of computer program instructions and other data. Examples of suitable devices for use as the storage device 112 include non-volatile information storage devices of various types, such as a flash memory module, a hard drive, or a solid-state drive.

The communications device 114 supports wired or wireless communications with other devices. Any suitable wired or wireless communications protocol may be used.

The sensors 116 are components that are incorporated in the head-mounted device 100 to generate sensor output signals to are used as inputs by the processor 108 for use in generating CGR content and controlling tension, as will be described herein. The sensors 116 include components that facilitate motion tracking (e.g., head tracking and optionally handheld controller tracking in six degrees of freedom). The sensors 116 may also include additional sensors that are used by the device to generate and/or enhance the user's experience in any way. The sensors 116 may include conventional components such as cameras, infrared cameras, infrared emitters, depth cameras, structured-light sensing devices, accelerometers, gyroscopes, and magnetometers. The sensors 116 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 116. The information that is generated by the sensors 116 is provided to other components of the head-mounted device 100, such as the processor 108, as inputs.

The power source 118 supplies electrical power to components of the head-mounted device 100. The power source 118 may supported by the device housing 102, may be supported by the headband 106, or may be electrically connected to electrical components of the head-mounted device 100 without a supporting physical connected to structural components of the head-mounted device 100. In some implementations, the power source 118 is a wired connection to electrical power. In some implementations, the power source 118 may include a battery of any suitable type, such as a rechargeable battery. In implementations that include a battery, the head-mounted device 100 may include components that facilitate wired or wireless recharging.

The display device 120 is connected to the device housing 102 and functions to display content to the user in the form of emitted light that is output by the display device 120 and is directed toward the user's eyes by the optical system 122. The display device 120 is a light-emitting display device, such as a video display of any suitable type, that is able to output images in response to a signal that is received from the processor 108. The display device 120 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 120 may include multiple individual display devices (e.g., two display screens or other display devices arranged side-by-side in correspondence to the user's left eye and the user's right eye).

The optical system 122 is associated with the display device 120 and is optically coupled to the display device 120. The optical system is connected to the device housing 102 such that portions of the optical system 122 (e.g., lenses) are positioned adjacent to the user's eyes. The optical system 122 directs the emitted light from the display device 120 to the user's eyes. In some implementations, the optical system 122 may be configured isolate the emitted light from environment light (e.g., as in a virtual reality type system), so that a scene perceived by the user is defined only by the emitted light and not by the environment light. In some implementations, the optical system 122 may be configured to combine the emitted light with environmental light so that the scene perceived by the user is defined by the emitted light and the environment light. In some implementations, the optical system 122 may combine the emitted light and the environment light so that a spatial correspondence is established between the emitted light and the environmental light to define the scene that is perceived by the user (e.g., as in an augmented reality type system). The optical system 122 may include lenses, reflectors, polarizers, filters, optical combiners, and/or other optical components.

The first headband connector 124 and the second headband connector 125 are releasable connecting devices that connect the headband 106 to the device housing 102 and allow the headband 106 to be partly or fully disconnected from the device housing 102. Partial disconnection means that a first end of the headband 106 is disconnected from the device housing 102 while a second end remains connected. Full disconnection means both first and second ends of the headband 106 are releasably connected to the device housing 102 and the first headband connector 124 includes releasable connections at both ends that allow the headband 106 to be completely detached from the device housing 102 and subsequently reattached.

Figure 2:
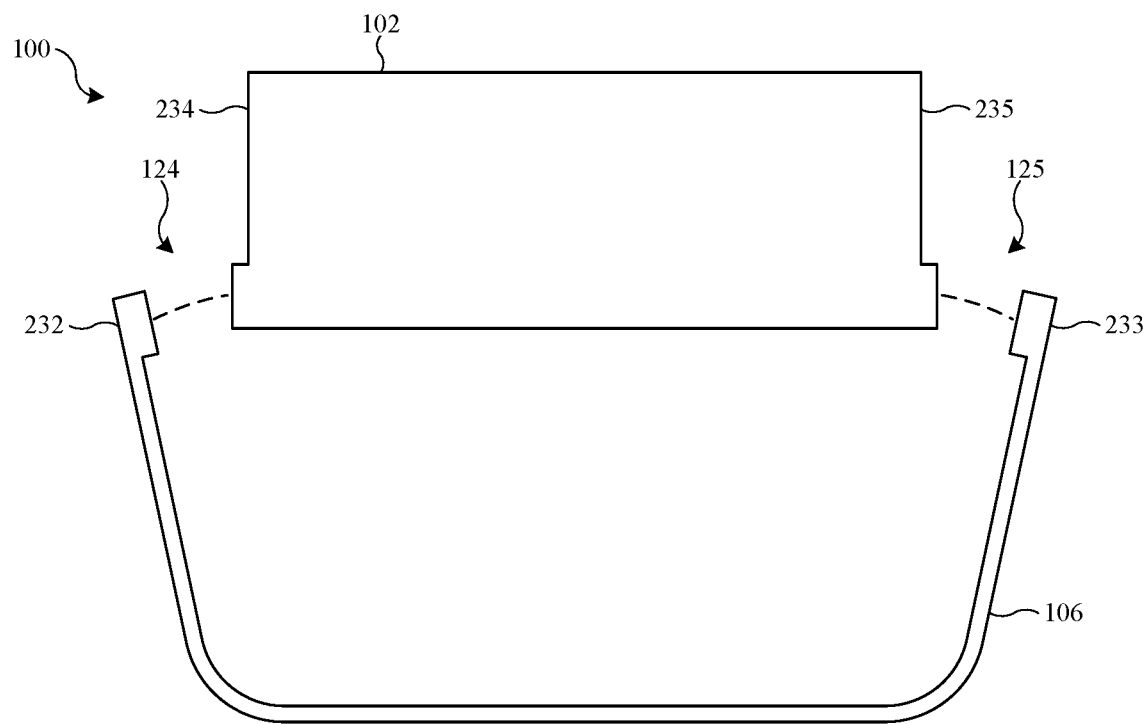
FIG. 2 is a top view illustration that shows the head-mounted device with a headband in a disconnected position with respect to a device housing.
Figure 3:
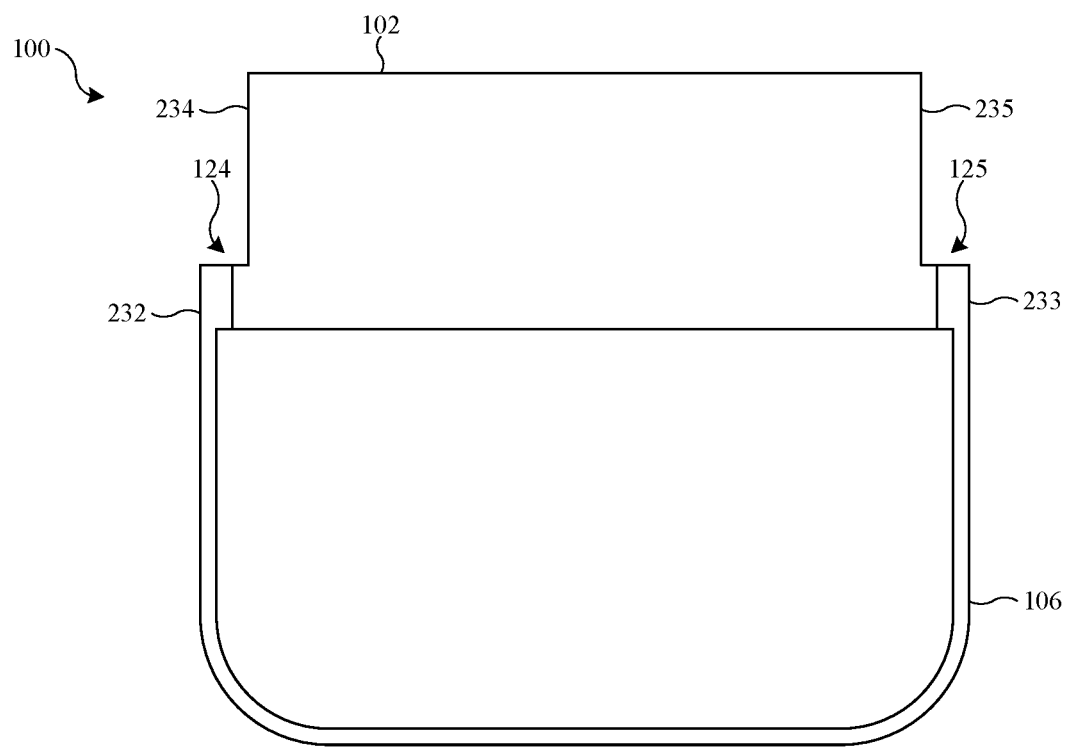
FIG. 3 is a top view illustration that shows the head-mounted device with the headband in a connected position with respect to the device housing.

FIG. 2 is a top view illustration that shows the head-mounted device 100 with the headband 106 in a disconnected position with respect to the device housing 102. FIG. 3 is a top view illustration that shows the head-mounted device 100 with the headband 106 in a connected position with respect to the device housing 102.

The headband 106 is connected to the device housing 102 by a first headband connector 124 and a second headband connector 125, which are implementations of the first headband connector 124. The first headband connector 124 connects a first end 232 of the headband 106 to a first lateral side 234 of the device housing 102. The second headband connector 125 connects a second end 233 of the headband 106 to a second lateral side 235 of the device housing 102. The first headband connector 124 and the second headband connector 125 allow the headband 106 to be moved between the disconnected position and the connected position. In the disconnected position (FIG. 2), both of the first end 232 of the headband 106 and the second end 233 of the headband 106 are disconnected from the device housing 102, such that the headband 106 is separable from the device housing 102. In the connected position (FIG. 3), both of the first end 232 of the headband 106 and the second end 233 of the headband 106 are connected to the device housing 102.

In the illustrated implementation, the first headband connector 124 and the second headband connector 125 define releasable connections at each of the first end 232 and the second end 233 of the headband 106. In an alternative implementation, the first headband connector 124 defines a releasable connection at the first end 232 of the headband 106, but the second headband connector 125 is omitted. Instead, the second end 233 of the headband 106 is directly connected to the device housing 102 by a non-releasable connection (i.e., the second end 233 of the headband 106 is releasable with respect to the device housing 102. The non-releasable connection of the second end 233 of headband 106 to the device housing 102 may be implemented using any structure that does not allow the second end 233 of the headband 106 to be readily detached from the device housing 102. As examples, the non-releasable connection may be a fastener, a bracket, a pivot joint, or other structure.

Figure 4:
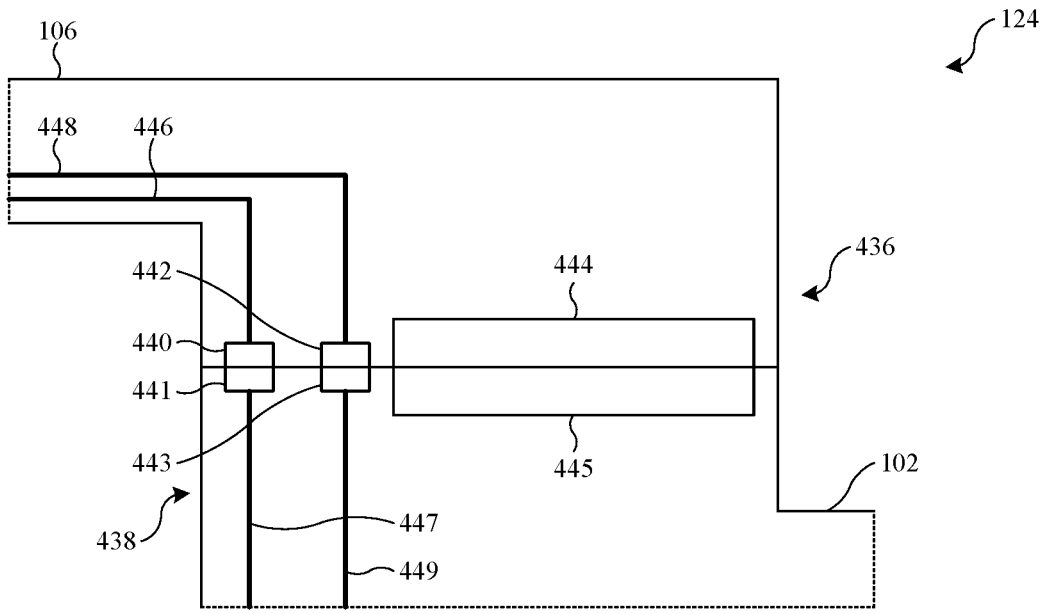
FIG. 4 is a cross-section illustration that shows a first headband connector in the disconnected position.
Figure 5:
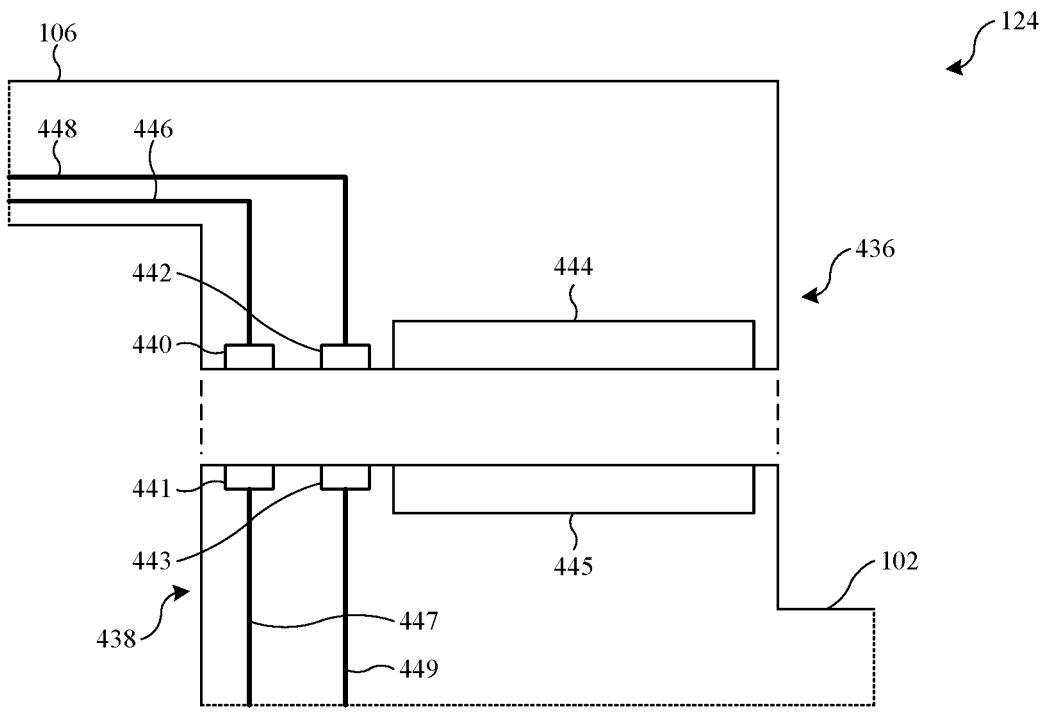
FIG. 5 is a cross-section illustration that shows the first headband connector in the connected position.

FIG. 4 is a cross-section illustration that shows the first headband connector 124 in the disconnected position. FIG. 5 is a cross-section illustration that shows the first headband connector 124 in the connected position. The second headband connector 125 may be configured in the same manner as the first headband connector 124, and the description of the first headband connector is applicable to the second headband connector 125.

The first headband connector 124 includes a headband-side connector portion 436 and a housing-side connector portion 438. The headband-side connector portion 436 includes components that can be attached to and released from components that are included in the housing-side connector portion 438 in order to define detachable electrical and structural (e.g., supporting) connections between the headband 106 and the device housing 102. The headband-side connector portion 436 and the housing-side connector portion 438 cooperate to define the connected position and the disconnected position for the headband 106 by defining corresponding connected and disconnected positions for the first headband connector 124. In the illustrated example, the first headband connector 124 is in the connected position when the headband-side connector portion 436 is connected to the housing-side connector portion 438, and with the first headband connector 124 is in the disconnected position when the headband-side connector portion 436 is disconnected from the housing-side connector portion 438.

In the illustrated example, the headband-side connector portion 436 includes a headband-side power connector 440, and the housing-side connector portion 438 includes a housing-side power connector 441. The headband-side power connector 440 and the housing-side power connector 441 define an electrical power connection for the first headband connector 124. The headband-side power connector 440 and the housing-side power connector 441 are connected when headband-side connector portion 436 is connected to the housing-side connector portion 438. The headband-side power connector 440 and the housing-side power connector 441 are disconnected when headband-side connector portion 436 is disconnected from the housing-side connector portion 438.

The headband 106 may include a headband-side power cable 446 that is connected to the headband-side power connector 440 and is connected to power-consuming or power supplying components that are connected to the headband 106. The device housing 102 may include a housing-side power cable 447 that is connected to the housing-side power connector 441 and is connected to power-consuming or power supplying components that are connected to the device housing 102.

When connected, the headband-side power connector 440 and the housing-side power connector 441 allow an electrical power supply connection to be established between the headband 106 and the device housing 102. This allows, for example, supply of electrical power to components that are located in the device housing 102 from a battery that is connected to the headband 106, or supply or electrical power to components that are connected to the headband 106 from a battery that is located in the device housing 102.

In the illustrated example, the headband-side connector portion 436 includes a headband-side signal connector 442, and the housing-side connector portion 438 includes a housing-side signal connector 443. The headband-side signal connector 442 and the housing-side signal connector 443 define a communications signal connection for the first headband connector 124. The headband-side signal connector 442 and the housing-side signal connector 443 are connected when the headband-side connector portion 436 is connected to the housing-side connector portion 438. The headband-side signal connector 442 and the housing-side signal connector 443 are disconnected when the headband-side connector portion 436 is disconnected from the housing-side connector portion 438.

The headband 106 may include a headband-side signal cable 448 that is connected to the headband-side signal connector 442 and is connected to electrical components that are connected to the headband 106 and which send and/or receive signals and/or data, such as sensor output signals or command values. The device housing 102 may include a housing-side signal cable 449 that is connected to the housing-side signal connector 443 and is connected to electrical components that are connected to the device housing 102 and which send and or receive signals and or data such as sensor output signals or command values.

When connected, the headband-side signal connector 442 and the housing-side signal connector 443 allow a signal transmission connection to be established between the headband 106 and the device housing 102. This allows, for example, sensor output signals from sensors that are located on the headband 106 to be transmitted to components that are located in the device housing 102, or for command values from components that are located in the device housing 102 to be transmitted to components that are located on the headband 106. An example, the signal transmission connection can allow an audio signal to be transmitted from components that are located in the device housing 102 to a loudspeaker that is located on the headband 106.

In the illustrated example, the headband-side connector portion 436 includes a headband-side structural connector 444 according to a first example, and the housing-side connector portion 438 includes a housing-side structural connector 445 according to a first example. The headband-side structural connector 444 and the housing-side structural connector 445 define a releasable structural connection between the headband-side connector portion 436 and the housing-side connector portion 438 of the first headband connector 124. The releasable structural connection, when connected, is configured to resist separation of the headband-side connector portion 436 from the housing-side connector portion 438. The releasable structural connection also allows for load transfer between the headband 106 and the device housing 102 in order to support the head-mounted device 100 in a fixed position with respect to the head of the user. The releasable structural connection is also configured to support torque loads and shear loads across the first headband connector 124 by resisting relative motion of the headband-side connector portion 436 and the housing-side connector portion 438 of the first headband connector 124.

As examples, the headband-side structural connector 444 and the housing-side structural connector 445 may be implemented using magnetic components, electromagnets, and/or mechanical connecting devices. Magnetic components include permanent magnets and ferromagnetic structures. Magnetic components are arranged in pairs that generate at least one of an attractive force or a repulsive force between them. A pair of magnetic components includes at least one permanent magnet, which is paired with a ferromagnetic structure or another permanent magnet. Electromagnets are arranged in a pair with a permanent magnet, a ferromagnetic structure, or another electromagnet.

Multiple types of components may be included in each of the headband-side structural connector 444 and the housing-side structural connector 445. In a first implementation, the headband-side structural connector 444 is a magnet and the housing-side structural connector 445 is a ferromagnetic structure. A ferromagnetic structure is defined herein as a structure that reacts to a magnet, such as a permanent magnet or a structure formed from iron or another material that is attracted to magnets. In a second implementation, the headband-side structural connector 444 is a first magnet and the housing-side structural connector 445 is a second magnet. In third implementation, the headband-side structural connector 444 is an electromagnet and the housing-side structural connector 445 is a ferromagnetic structure.

Thus, in one implementation of the first headband connector 124, the first headband connector 124 is movable between a disconnected position, in which a headband-side connector portion is disconnected from a device-side connector portion, and a connected position, in which the headband-side connector portion is connected to the device-side connector portion. In this implementation, the first headband connector 124 includes magnetic components that are configured to attract the headband-side connector portion and the device-side connector portion to one another to urge the first headband connector 124 to move to the connected position.

Figure 6:
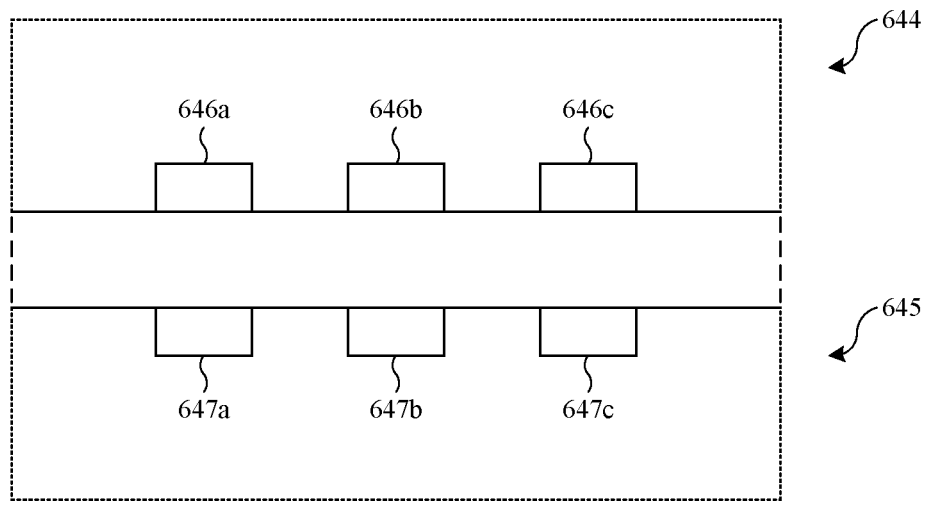
FIG. 6 is an illustration that shows a headband-side structural connector and a housing-side structural connector according to an example.

FIG. 6 is an illustration that shows a headband-side structural connector 644 and a housing-side structural connector 645 according to an example. The headband-side structural connector 644 and the housing-side structural connector 645 may be incorporated in the first headband connector 124 or the second headband connector 125 in place of the headband-side structural connector 444 and the housing-side structural connector 445.

The headband-side structural connector 644 and the housing-side structural connector 645 facilitate movement between connected and disconnected positions. The headband-side structural connector 644 includes an array of magnetic components that is defined by magnetic components 646a, 646b, and 646c. The housing-side structural connector 645 includes an array of magnetic components that is defined by magnetic components 647a, 647b, and 647c.

Pairs of magnetic components from the headband-side structural connector 644 and the housing-side structural connector 645 are attracted to one another. Magnetic attraction of the pairs of magnetic components urges the headband-side structural connector 644 and the housing-side structural connector 645 toward the connected position and also resists disconnection of the headband-side structural connector 644 and the housing-side structural connector 645 by movement from the connected position to the disconnected position.

As an example, the pairs of magnetic components may include a first pair of magnetic components 646a, 647a, a second pair of magnetic components 646b, 647b, and a third pair of magnetic components 646c, 647c. As one example, each pair of magnetic components may include a permanent magnet and a ferromagnetic structure (e.g., iron or a permanent magnet) that are arranged so that the permanent magnet is attracted to the ferromagnetic structure. As another example, each pair of magnetic components may include a first magnet and a second magnet that are oriented with opposite poles facing one another (e.g., a south pole facing a north pole) such that the magnets from the pair are attracted to one another.

To move from the disconnected position to the connected position, the user places the headband-side structural connector 644 near the housing-side structural connector 645 such that magnetic attraction between the pairs of magnetic components causes connection of the headband-side structural connector 644 and the housing-side structural connector 645. To move from the connected position to the disconnected position, the user applies sufficient force to the headband to overcome the magnetic attraction force between the pairs of magnetic components of the headband-side structural connector 644 and the housing-side structural connector 645.

Thus, in one implementation of the first headband connector 124, the first headband connector 124 is movable between a disconnected position, in which a headband-side connector portion is disconnected from a device-side connector portion, and a connected position, in which the headband-side connector portion is connected to the device-side connector portion. In this implementation, the first headband connector 124 includes paired magnetic components, such as the first pair of magnetic components 646a, 647a, the second pair of magnetic components 646b, 647b, and the third pair of magnetic components 646c, 647c, that are arranged on the headband-side connector portion and the device-side connector portion. The paired magnetic components are configured to attract the headband-side connector portion and the device-side connector portion to one another to urge the first headband connector 124 to move to the connected position.

Figure 7:
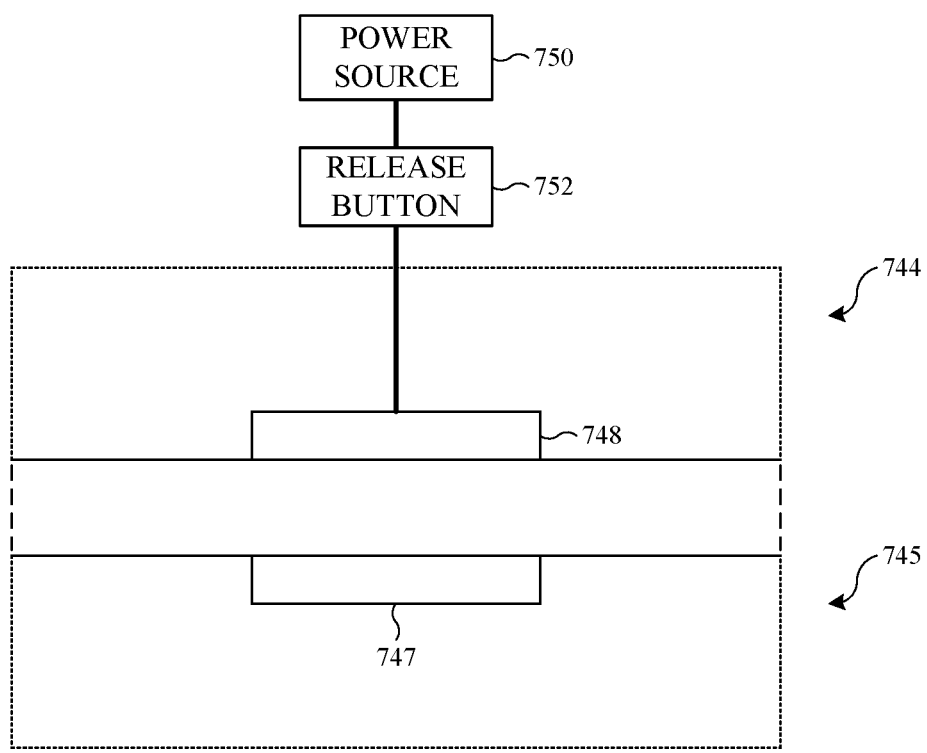
FIG. 7 is an illustration that shows a headband-side structural connector and a housing-side structural connector according to an example.

FIG. 7 is an illustration that shows a headband-side structural connector 744 and a housing-side structural connector 745 according to an example. The headband-side structural connector 744 and the housing-side structural connector 745 may be incorporated in the first headband connector 124 or the second headband connector 125 in place of the headband-side structural connector 444 and the housing-side structural connector 445.

The headband-side structural connector 744 and the housing-side structural connector 745 facilitate movement between connected and disconnected positions. The headband-side structural connector 744 includes an electromagnet 748. The housing-side structural connector 745 includes a magnetic component 747, such as a ferromagnetic structure.

The electromagnet 748 of the headband-side structural connector 744 is operable to apply a magnetic attraction force to the magnetic component 747 of the housing-side structural connector 745 when an electric current is applied to the electromagnet 748 to maintain the headband-side structural connector 744 and a housing-side structural connector 745 in the connected position. To apply electric current to the electromagnet 748, a power source 750 and a release button 752 are electrically connected to the electromagnet 748. As an example, the power source 750 may be a battery that is located on the headband of the device. The release button 752 may be a physical switch or a touch sensitive area that is located on the headband at a location that is spaced from the headband connector to reduce the number of components that need to be located in the area of the headband connector.

The power source 750 applies an electric current to the electromagnet 748 to attract the magnetic component 747 at to the electromagnet 748. When the headband-side structural connector 744 is moved near the housing-side structural connector 745, the magnetic attraction force that is applied to the magnetic component 747 by the electromagnet 748 causes the headband-side structural connector 744 and the housing-side structural connector 745 to move to the connected position.

The release button 752 is operable to change operation of the electromagnet to cause the headband connector to move from the connected position to the disconnected position. For example, the release button 752 may be operated by the user to interrupt supply of the electric current to the electromagnet 748 by the power source 750. Upon operation of the release button 752 by the user, the electromagnet 748 no longer generates a magnetic attraction force that is sufficient to maintain connection of the headband-side structural connector 744 to the housing-side structural connector 745. As a result, the headband-side structural connector 744 and the housing-side structural connector 745 move to the disconnected position upon operation of the release button 752.

Thus, the electromagnet 748 is operable to apply a magnetic attraction force to maintain a headband connector (e.g., the first headband connector 124 of the second headband connector 125) in the connected position, and the release button 752, when operated by the user, causes the electromagnet 748 to cease application of the magnetic attraction to cause the headband connector to move from the connected position to the disconnected position. As examples, the electromagnet 748 may cease application of the magnetic attraction when electrical power is no longer supplied to the electromagnet 748 from the power source 750, or the electromagnet 748 may cease application of the magnetic attraction when a polarity of the electrical power that is supplied to the electromagnet 748 from the power source 750 is reversed so that the electromagnet 748 generates a repulsive force instead of an attractive force.

In some implementations, operation of the electromagnet 748 may be controlled in part by a sensing arrangement that detects proximity of the headband-side structural connector 744 to the housing-side structural connector 745. As one example, a mechanical switch may be associated with the headband-side structural connector 744 to detect proximity of the housing-side structural connector 745. As another example, a non-contact sensor may be associated with the headband-side structural connector 744 to detect proximity of the housing-side structural connector 745. Examples of non-contact sensors include photosensors and reed switches (e.g., to detect proximity of a magnet associated with the housing-side structural connector 745). In these implementations, the electromagnet 748 is only operated (e.g., by supply of electric current to it) when proximity of the housing-side structural connector 745 is detected, but the release button 752 continues to function as previously described, by interrupting supply of electric current to the electromagnet 748 when operated.

In some implementations, operation of the electromagnet 748 may be controlled in part by a sensing arrangement that detects a force applied to the headband based on current draw by the electromagnet 748. Current draw by the electromagnet 748 can be measured to detect a user intention to move from the connected position to the disconnected position because the current draw of the electromagnet 748 will increase in response to an applied force. It can be determined that the user intends to release the headband connector when the current draw of the electromagnet 748 exceeds a threshold value. Thus, the electromagnet 748 may release in response to detecting current draw above a threshold in response to an applied force. As one example, the electromagnet may cease application of the magnetic attraction to release the electromagnet 748 when the current draw exceeds a threshold in response to an applied force. As another example, the electromagnet 748 may reverse a polarity of the electrical power that is supplied to the electromagnet 748 from the power source 750 is reversed so that the electromagnet 748 generates a repulsive force instead of an attractive force when the current draw of the electromagnet 748.

In some implementations, the magnitude of the attraction force applied by the electromagnet 748 is controlled based on one or more factors. As one example, motion of the head mounted device (e.g., the head-mounted device 100) is measured using sensors that are located in the device housing or on the headband. The motion of the device that is measured by the sensors may include a velocity value and/or an acceleration value. As an example, the sensors can be accelerometers or other sensors that measure motion of the device. The magnitude of the attraction force can be varied based on motion of the device, for example, by increasing the magnitude of the attraction force applied by the electromagnet 748 when an amount of sensed motion is above a threshold value, and by decreasing the magnitude of the attraction force that is applied by the electromagnet 748 when an amount of sensed motion is below a threshold value. As another example, information that describes a user preference can be used to set the magnitude of the attraction force that is applied by the electromagnet 748. As another example, the user may be prompted to select the magnitude of the attraction force that is applied by the electromagnet 748.

As another example, information that is associated with an application can be used to set the magnitude of the attraction force applied by the electromagnet 748. For example, a value that describes the magnitude of attraction force to be applied by the electromagnet 748 can be supplied by the application and used to control the electromagnet 748. As another example, a category value that corresponds to the magnitude of attraction force to be applied by the electromagnet 748 can be supplied by the application and used to control the electromagnet 748. As examples, category values can correspond to a high-motion category for which a high attraction force is to be applied by the electromagnet 748 and a low motion category for which a relatively lower attraction force is to be applied by the electromagnet 748.

As another example, the forced applied by the electromagnet 748 may be controlled based on the likelihood that the headband will be snagged, for example, based on the environment where the device is being used. By reducing the holding force applied by the electromagnet 748, the headband can be released easily if snagged. As another example a tension sensor can detect that force above a threshold value has been applied to the headband, and the electromagnet 748 can be controlled to release the headband. As another example, by measuring tension applied to the band when the electromagnet 748 releases, the device can determine that the electromagnet 748 is dirty, and alert the user.

Figure 8:
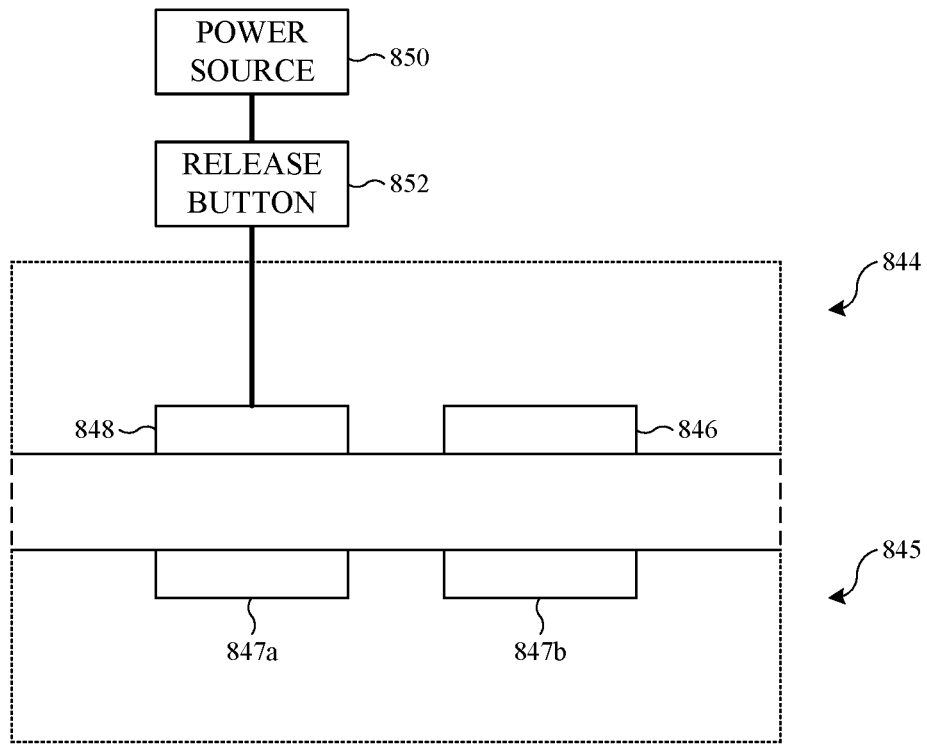
FIG. 8 is an illustration that shows a headband-side structural connector and a housing-side structural connector according to an example.

FIG. 8 is an illustration that shows a headband-side structural connector 844 and a housing-side structural connector 845 according to an example. The headband-side structural connector 844 and the housing-side structural connector 845 may be incorporated in the first headband connector 124 or the second headband connector 125 in place of the headband-side structural connector 444 and the housing-side structural connector 445.

The headband-side structural connector 844 and the housing-side structural connector 845 facilitate movement between connected and disconnected positions. The headband-side structural connector 844 includes an electromagnet 848 and a magnetic component 846. The housing-side structural connector 845 includes a first magnetic component 847a and a second magnetic component 847b.

The magnetic component 846 of the headband-side structural connector 844 and the second magnetic component 847b of the housing-side structural connector 845 are operable to generate a magnetic attraction force when the headband-side structural connector 844 is in proximity of the housing-side structural connector 845. The magnetic attraction force between the headband-side structural connector 844 and the housing-side structural connector 845 is operable to move the headband-side structural connector 844 and the housing-side structural connector 845 to the connected position, and retain them in the connected position until released.

The electromagnet 848 is connected to a power source 850 and a release button 852. The electromagnet 848 is operable to generate a magnetic repulsion force that repels the first magnetic component 847a when an electric current is applied to the electromagnet 848. The release button 852 is operable to change operation of the electromagnet 848 to cause the headband connector to move from the connected position to the disconnected position. For example, the electric current may be applied to the electromagnet 848 from the power source 850 in response to operation of the release button 852, which causes disconnection of the headband-side structural connector 844 from the housing-side structural connector 845 by application of a repulsive force that is generated by the release button 852. The electromagnet 848 is otherwise similar to the electromagnet 748 and the description of the electromagnet 748 is applicable to the electromagnet 848 except as noted above.

For example, a headband connector may include paired magnetic components that are configured to maintain the headband connector in the connected position when the electromagnet 848 is not operated. The electromagnet 848 is operable to apply a magnetic repulsion force to move the headband connector from the connected position to the disconnected position when the electromagnet 848 is operated. Thus, when the release button 852 is operated by the user, this causes the electromagnet 848 to apply the magnetic repulsion force (e.g., by supply of electrical power from the power source 850 to the electromagnet 848 (to cause the headband connector to move from the connected position to the disconnected position.

Figure 9:
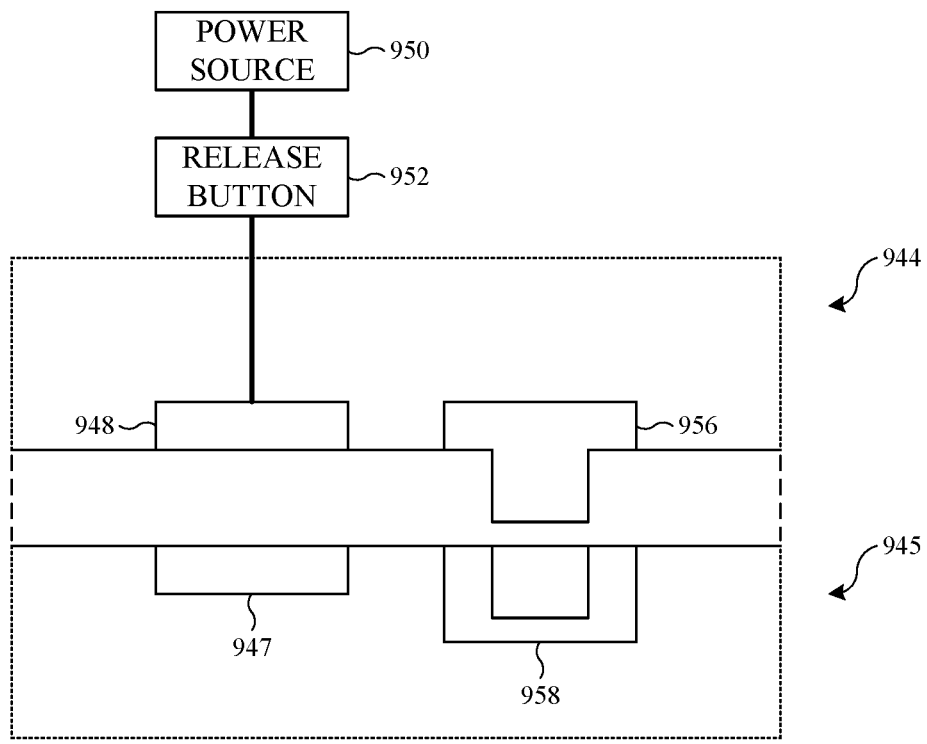
FIG. 9 is an illustration that shows a headband-side structural connector and a housing-side structural connector according to an example.

FIG. 9 is an illustration that shows a headband-side structural connector 944 and a housing-side structural connector 945 according to an example. The headband-side structural connector 944 and the housing-side structural connector 945 may be incorporated in the first headband connector 124 or the second headband connector 125 in place of the headband-side structural connector 444 and the housing-side structural connector 445.

The headband-side structural connector 944 and the housing-side structural connector 945 facilitate movement between connected and disconnected positions. The headband-side structural connector 944 includes an electromagnet 948 and a first mechanical connector part 956. The housing-side structural connector 945 includes a magnetic component 947 and a second mechanical connector part 958.

The first mechanical connector part 956 and the second mechanical connector part 958 are engageable with one another two define a mechanical connection between the headband-side structural connector 944 and the housing-side structural connector 945. As examples, the first mechanical connector part 956 and the second mechanical connector part 958 may include a latching mechanism, a friction fit mechanism, or another type of mechanical connection mechanism. The first mechanical connector part 956 and the second mechanical connector part 958 define the connected position upon engagement with one another. The first mechanical connector part 956 and the second mechanical connector part 958 are configured to release from one another in response to an applied force that moves the first mechanical connector part 956 away from the second mechanical connector part 958. Thus, disconnection may occur in response to application of a separating force in excess of a threshold value that exceeds a holding force between the first mechanical connector part 956 and the second mechanical connector part 958.

The electromagnet 948 is connected to a power source 950 and a release button 952. The electromagnet 948 is operable to generate a magnetic repulsion force that repels the magnetic component 947 when an electric current is applied to the electromagnet 948. The electric current is applied to the electromagnet 948 from the power source 950 in response to operation of the release button 952, which causes disconnection of the headband-side structural connector 944 from the housing-side structural connector 945. The electromagnet 948 is otherwise similar to the electromagnet 748 and the description of the electromagnet 748 is applicable to the electromagnet 948 except as noted above.

Figure 10:
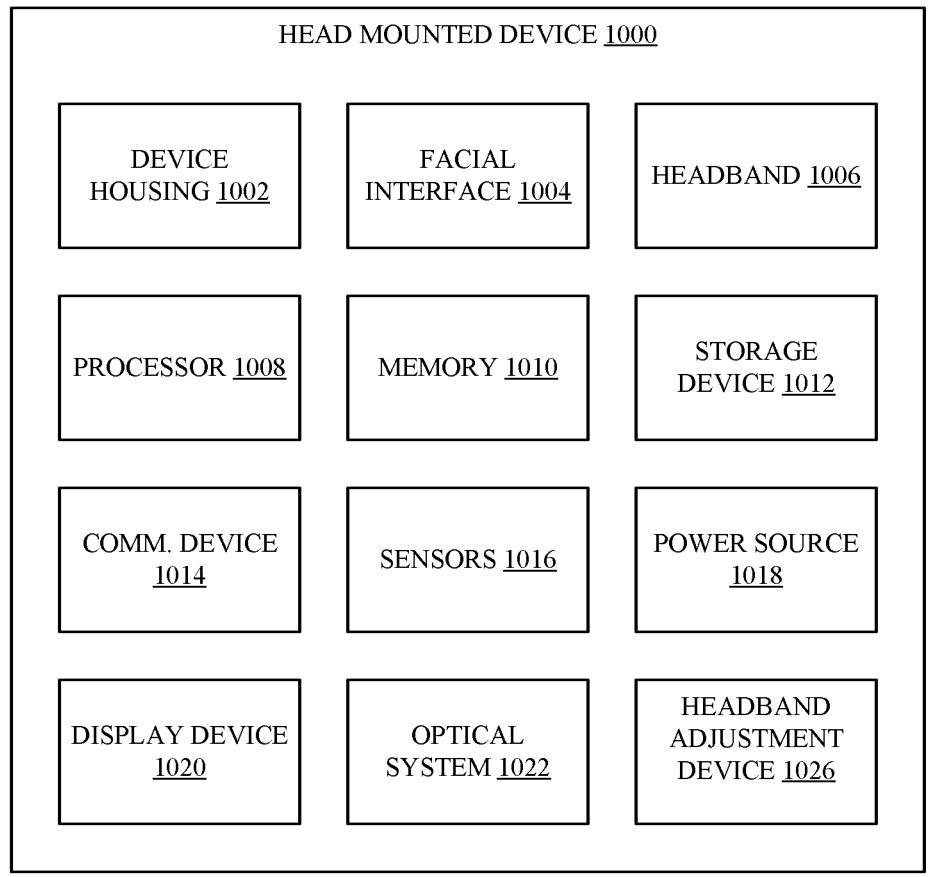
FIG. 10 is a block diagram that shows an example of a hardware configuration for a head-mounted device.

FIG. 10 is a block diagram that shows an example of a hardware configuration for a head-mounted device 1000. The head-mounted device 1000 is intended to be worn on the head of a user and includes components that are configured to display content to the user. Components that are included in the head-mounted device 1000 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

The head-mounted device 1000 includes components that are similar to those found in the head-mounted device 100, Except as otherwise described herein. In the illustrated example, the head-mounted device 1000 includes a device housing 1002, a facial interface 1004, a headband 1006, a processor 1008, a memory 1010, a storage device 1012, a communications device 1014, sensors 1016, a power source 1018, a display device 1020, an optical system 1022, which may be implemented in accordance with the description of like-named components from the head-mounted device 100, and the description of those components is hereby incorporated by reference in the description of the head-mounted device 1000. The head-mounted device 1000 also includes a headband adjustment device 1026.

In some implementations of the head-mounted device 1000, some or all of these components may be included in a separate device that is removable. For example, any or all of the processor 1008, the memory 1010, and/or the storage device 1012, the communications device 1014, the sensors 1016, the power source 1018, and the display device 1020 may be incorporated in a device such as a smart phone that is connected (e.g., by docking) to the other portions of the head-mounted device 1000.

In some implementations of the head-mounted device 1000, the processor 1008, the memory 1010, and/or the storage device 1012 are omitted, and the corresponding functions are performed by an external device that communicates with the head-mounted device 1000. In such an implementation, the head-mounted device 1000 may include components that support a data transfer connection with the external device using a wired connection or a wireless connection that is established using the communications device 1014.

Figure 11:
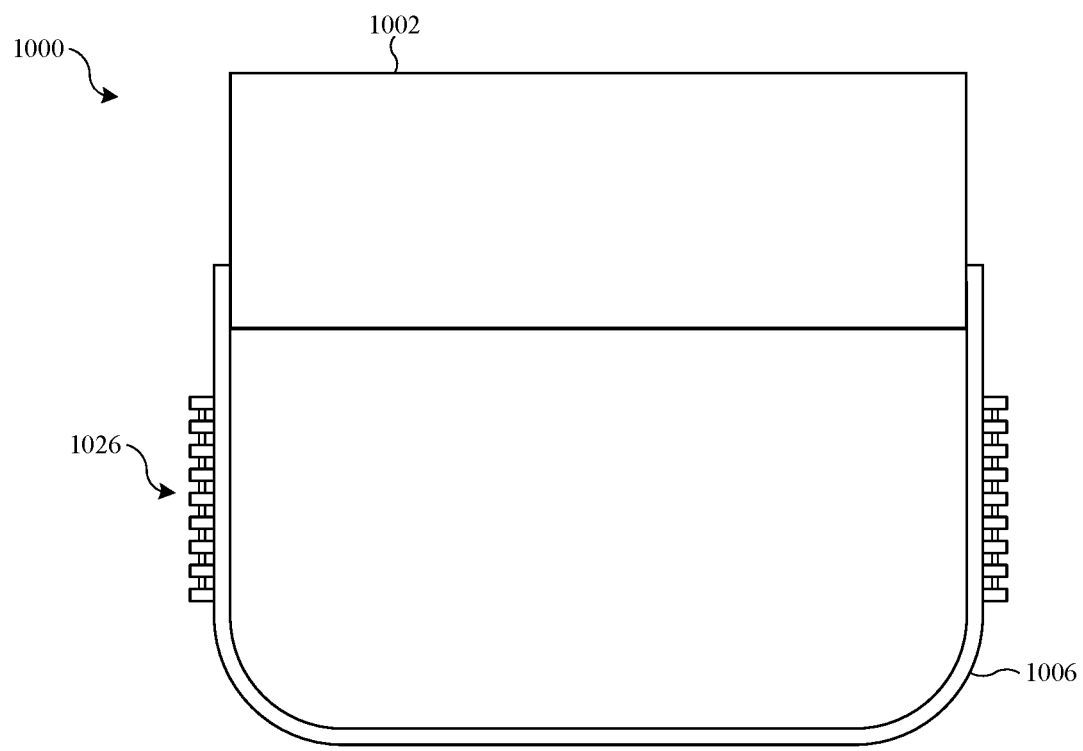
FIG. 11 is a top view illustration that shows the head-mounted device with a headband adjustment device in an expanded position.
Figure 12:
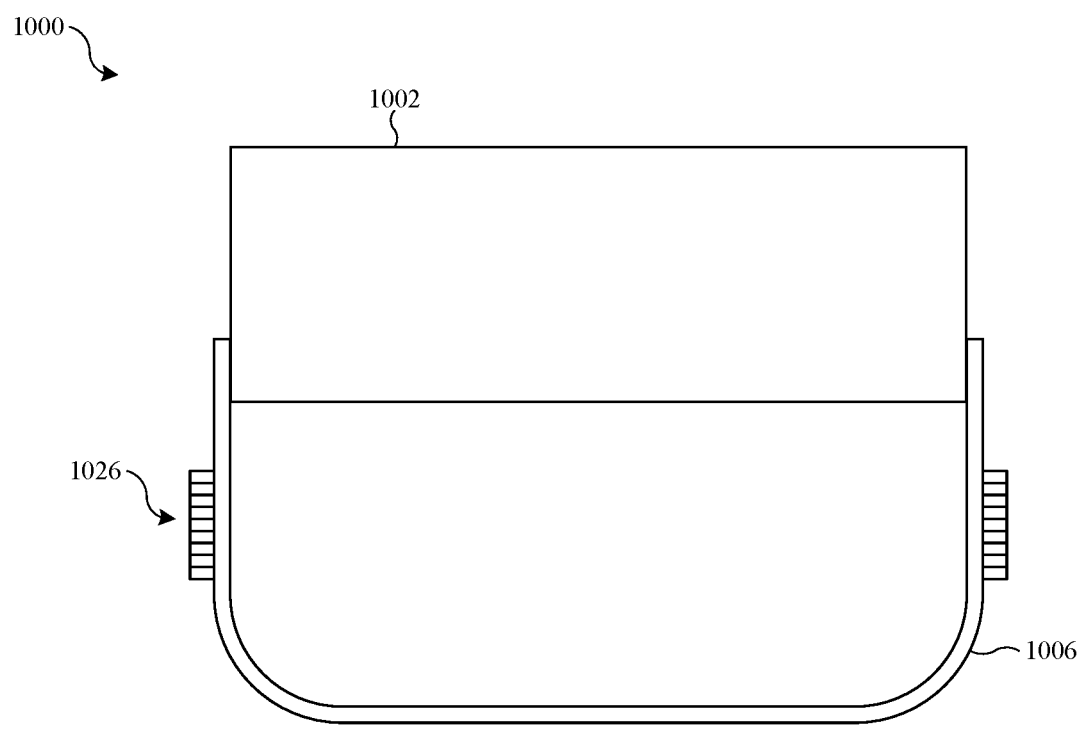
FIG. 12 is a top view illustration that shows the head-mounted device with the headband adjustment device in a contracted position.

FIG. 11 is a top view illustration that shows the head-mounted device 1000 with the headband adjustment device 1026 in an expanded position. FIG. 12 is a top view illustration that shows the head-mounted device 1000 with the headband adjustment device 1026 in a contracted position. In the illustrated example, two of the headband adjustment devices are connected to the headband 1006. The number of the headband adjustment devices may be varied.

The headband adjustment device 1026 is located on the headband 1006 and is operable to expand and contract a length of the headband 1006. By changing the length of the headband 1006, the fit of the headband 1006 relative to the user's head may be adjusted, and the amount of force applied to the user's head by the headband 1006 may be adjusted. The headband 1006 may be formed from a flexible and elastic material. This allows the headband 1006 to be expanded and contracted by expansion and contraction of the headband adjustment device 1026.

The headband adjustment device 1026 may be configured to expand and contract in response to commands (e.g., using buttons, a user interface, verbal commands, etc.) from the user. Commands from the user may be received and processed by components of the head-mounted device 1000, such as the processor 1008, and relayed to the headband adjustment device 1026 in the form of control signals, such as a variable voltage that controls whether the headband adjustment device expands, contracts, or remains in its current position.

The headband adjustment device 1026 may be configured to expand and retract in response to signals from the sensors 1016. As one example, the headband adjustment device 1026 may be configured to expand or contract the length of the headband 1006 in response to signals from a tension sensor that detects an amount of tension placed on the headband 1006. As another example, the headband adjustment device 1026 may be configured to expand or contract the length of the headband 1006 in response to signals from a motion sensor that detects a magnitude of movement (e.g., velocity and/or acceleration) experienced by the head-mounted device 1000. As another example, the headband adjustment device 1026 may be configured to expand or contract the length of the headband 1006 in response to determining a magnitude of movement (e.g., velocity and/or acceleration) experienced by the head-mounted device 1000 based on images (e.g., video frames) obtained by cameras that are included in the head-mounted device 1000. Thus, signals from the sensors 1016 (and/or other components such as the optical system 1022) may be used as feedback signals to continuously control adjustment of the headband 1006 using the headband adjustment device 1026.

For example, the head-mounted device 1000 may control the headband adjustment device 1026 to automatically tighten in response to a high amount of detected motion or increase of detected motion of the head-mounted device 1000 (e.g., a magnitude of motion above a threshold) and automatically loosen in response to a low amount of detected motion or a decrease in detected motion of the head-mounted device 1000. Thus, for example, the head-mounted device 1000 may include a sensor (e.g., sensors 1016) that outputs a signal that represents a magnitude of motion, wherein a magnitude of tension applied to the headband 1006 by the headband adjustment device 1026 is controlled according to the signal.

Figure 13:
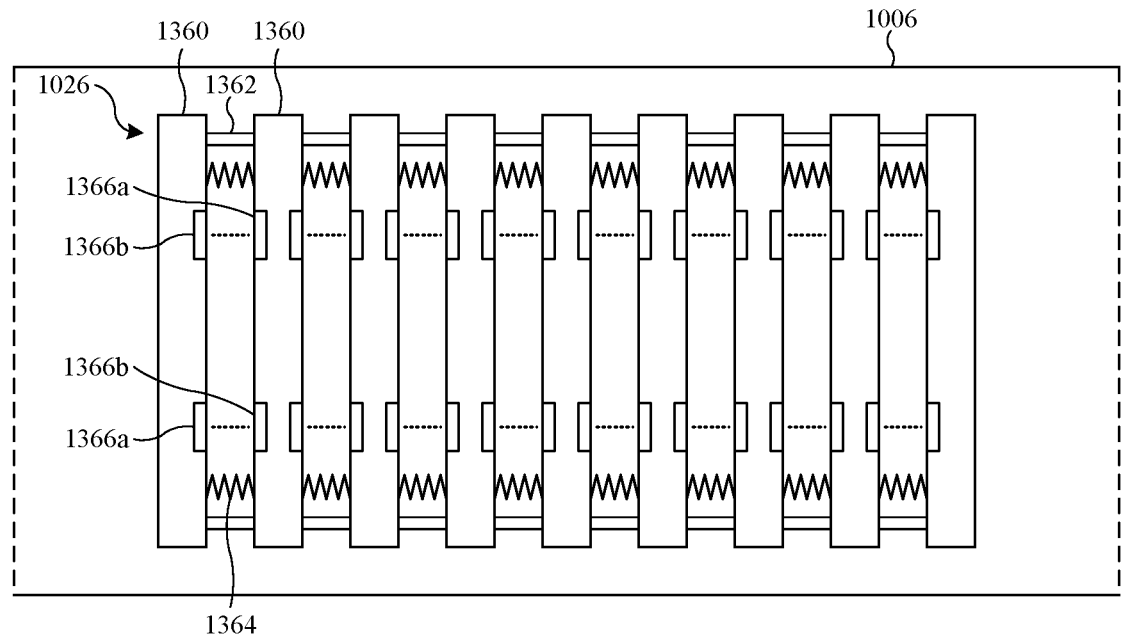
FIG. 13 is a side view detail that shows the headband and the headband adjustment device in the expanded position.
Figure 14:
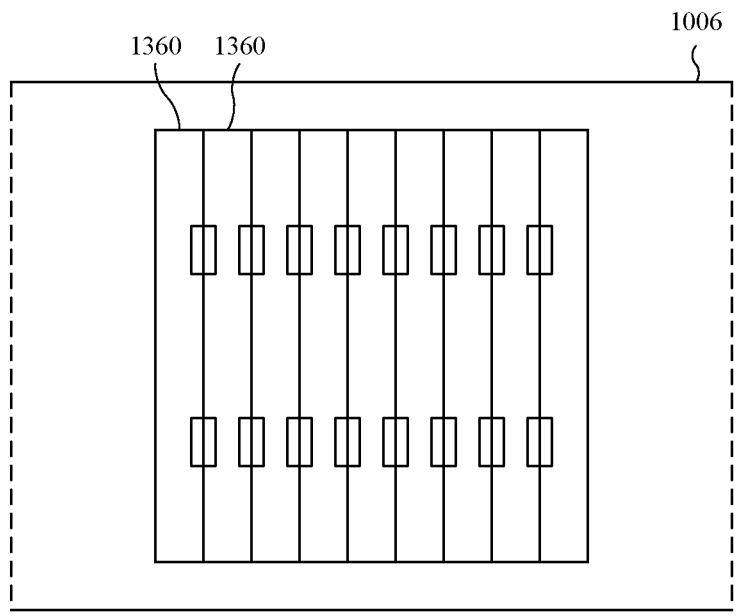
FIG. 14 is a side view detail that shows the headband and the headband adjustment device in the contracted position.

FIG. 13 is a side view detail that shows the headband 1006 and the headband adjustment device 1026 in the expanded position. FIG. 14 is a side view detail that shows the headband 1006 and the headband adjustment device 1026 in the contracted position. The headband adjustment device 1026 includes adjuster portions 1360 (e.g., two or more of the adjuster portions). In the illustrated example, the headband adjustment device 1026 includes nine of the adjuster portions 1360, but the number of the adjuster portions 1360 may be varied. The adjuster portions 1360 are rigid or semi rigid structures that are able to move toward each other to contract the length of the headband 1006 and away from each other to expand the length of the headband 1006. Thus, the headband adjustment device 1026 is connected to the headband 1006 and is able to contract and expand a length of the headband 1006 by moving the adjuster portions 1360 with respect to one another.

In the illustrated example, the adjuster portions 1360 are upright, narrow structures that each extend in a generally upward/downward direction relative to the headband 1006, and are spaced from each other along a length direction of the headband 1006 in the expanded position. At least two of the adjuster portions 1360 are directly connected to the headband 1006 and are movable with respect to each other to expand and contract the length of the headband 1006. In some implementations, all of the adjuster portions 1360 are directly connected to the headband 1006 and are movable with respect to each other to expand and contract the length of the headband 1006.

The adjuster portions 1360 may be connected to one another by connecting structures 1362 that allow the adjuster portions 1360 to move toward each other and away from each other. As an example, the connecting structures 1362 may be structures such as rods or cables that the adjuster portions are connected to by fixed connections and/or sliding connections. Biasing structures 1364 such as springs may be placed between adjacent pairs of the adjuster portions 1360 to urge the adjacent pairs of the adjuster portions 1360 away from each other (e.g., using compression springs) or to urge the adjacent pairs of adjuster portions 1360 toward each other (e.g., using tension springs).

Adjacent ones of the adjuster portions 1360 are related to each other by an electromagnetic device that includes an electromagnet 1366a and a magnetic component 1366b. The magnetic component 1366b may be a ferromagnetic structure that may be attracted to and/or repelled by the electromagnet 1366a.

In some implementations, the electromagnetic devices are configured such that a repulsive force generated by one of the electromagnets 1366a relative to a respective one of the magnetic components 1366b is used to move adjacent pairs of the adjuster portions 1360 away from each other to expand the headband 1006 (e.g., against a spring force applied by tension springs included in the biasing structures 1364) as shown in FIG. 13.

In some implementations, the electromagnetic devices are configured such that an attractive force generated by one of the electromagnets 1366a relative to a respective one of the magnetic components 1366b is used to move adjacent pairs of the adjuster portions 1360 toward each other to contract the headband 1006 (e.g., against a spring force applied by compression springs included in the biasing structures 1364) as shown in FIG. 14.

In some implementations, adjacent ones of the adjuster portions 1360 may be held against one another (e.g., in engagement with one another) using pairs of permanent magnets and ferromagnetic structures that attract adjacent pairs of the adjuster portions 1360 to each other until repelled by a repulsive force generated by one of the electromagnets 1366a relative to a respective one of the magnetic components 1366b.

By movement of the adjuster portions 1360 toward each other, the length of the headband 1006 is decreased. By movement of the adjuster portions 1360 away from each other, the length of the headband 1006 is increased. In implementations where the headband 1006 is formed from a flexible elastic material, increasing the length of the headband 1006 can include stretching the elastic material to make it longer, and decreasing the length of the headband 1006 can include relaxing a degree to which the elastic material is stretched to make it shorter. The headband 1006 may also decrease in length by folding and increase in length by unfolding. in some implementations, the headband 1006 is discontinuous, and is connected to a first end of the headband adjustment device 1026 and to a second end of the headband adjustment device 1026. In such an implementation, the headband adjustment device 1026 defines part of the length of the headband 1006, and increases and decreases in length of the headband adjustment device 1026 by relative movement of the adjuster portions 1360 cause the length of the headband 1006 to increase and decrease in length.

In the illustrated example, the headband adjustment device 1026 is shown in a fully expanded position and in a fully contracted position. It should be understood, that the degree by which the headband 1006 is lengthened or shortened can be controlled by controlling movement of adjacent pairs of the adjuster portions 1360 independently of each other. Thus, by moving one pair of the adjuster portions 1360 together, the headband 1006 is shortened by a first amount, and by moving two pairs of the adjuster portions together, the headband 1006 is shortened by a second amount that is larger than the first amount. This allows for shortening and lengthening of the headband 1006 between a minimum length and a maximum length.

Figure 15:
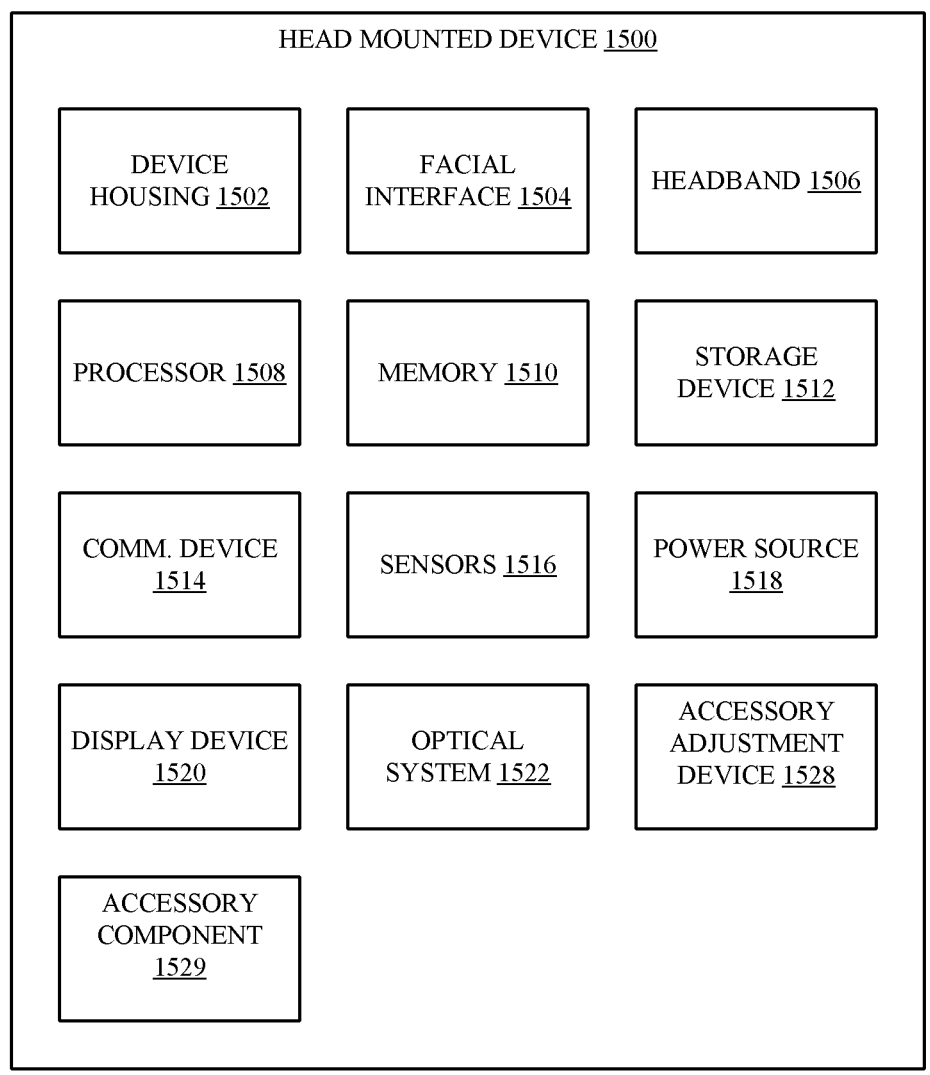
FIG. 15 is a block diagram that shows an example of a hardware configuration for a head-mounted device.

FIG. 15 is a block diagram that shows an example of a hardware configuration for a head-mounted device 1500. The head-mounted device 1500 is intended to be worn on the head of a user and includes components that are configured to display content to the user. Components that are included in the head-mounted device 1500 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

The head-mounted device 1500 includes components that are similar to those found in the head-mounted device 100, Except as otherwise described herein. In the illustrated example, the head-mounted device 1500 includes a device housing 1502, a facial interface 1504, a headband 1506, a processor 1508, a memory 1510, a storage device 1512, a communications device 1514, sensors 1516, a power source 1518, a display device 1520, an optical system 1522, which may be implemented in accordance with the description of like-named components from the head-mounted device 100, and the description of those components is hereby incorporated by reference in the description of the head-mounted device 1500.

Figure 16:
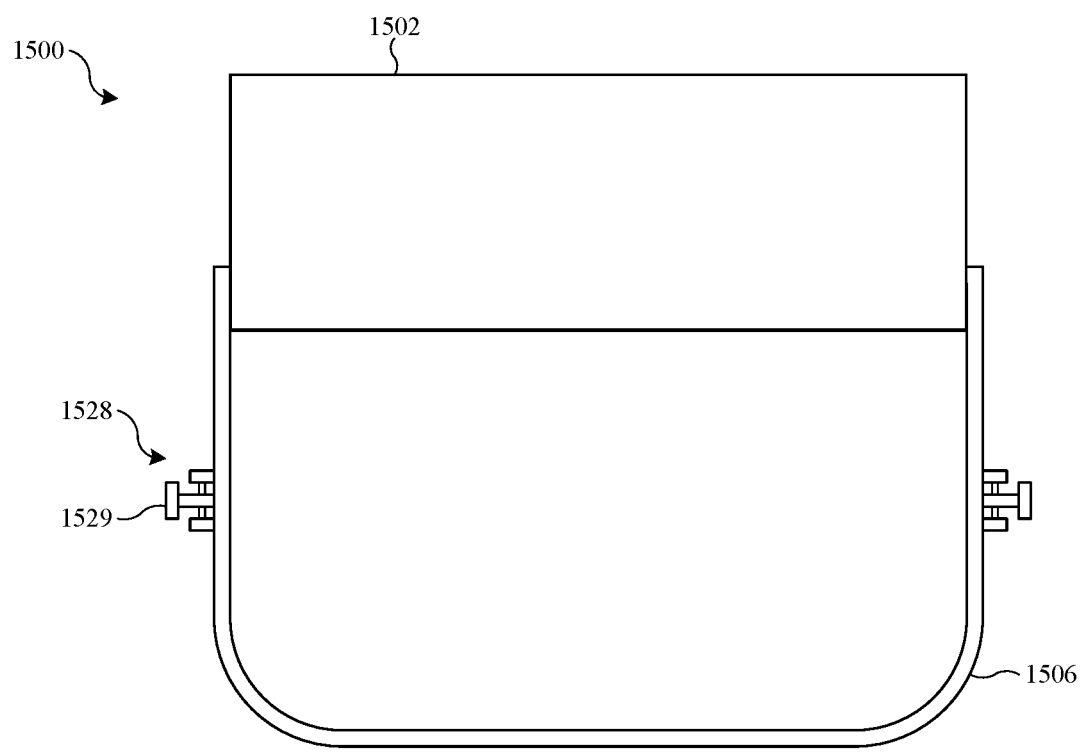
FIG. 16 is a top view illustration that shows the head-mounted device and the accessory adjustment device.

The head-mounted device 1500 also includes an accessory adjustment device 1528 and an accessory component 1529. FIG. 16 is a top view illustration that shows the head-mounted device 1500 and the accessory adjustment device 1528. The accessory adjustment device 1528 is connected to the headband 1506 and functions to adjust the position of the accessory component 1529 relative to the headband 1506, for example, by moving the accessory component forward and rearward along the length direction of the headband 1506. As one example, the accessory component 1529 may be a loudspeaker, and the accessory adjustment device 1528 may connect the loudspeaker to the headband 1506 and allow adjustment of the position of the loudspeaker relative to the headband 1506. This would allow the accessory adjustment device 1528 to, for example, align the loudspeaker or other accessory component 1529 relative to the user's ear or other feature. As another example, the accessory component 1529 may be a health-monitoring device.

In some implementations of the head-mounted device 1500, some or all of these components may be included in a separate device that is removable. For example, any or all of the processor 1508, the memory 1510, and/or the storage device 1512, the communications device 1514, the sensors 1516, the power source 1518, and the display device 1520 may be incorporated in a device such as a smart phone that is connected (e.g., by docking) to the other portions of the head-mounted device 1500.

In some implementations of the head-mounted device 1500, the processor 1508, the memory 1510, and/or the storage device 1512 are omitted, and the corresponding functions are performed by an external device that communicates with the head-mounted device 1500. In such an implementation, the head-mounted device 1500 may include components that support a data transfer connection with the external device using a wired connection or a wireless connection that is established using the communications device 1514.

Figure 17:
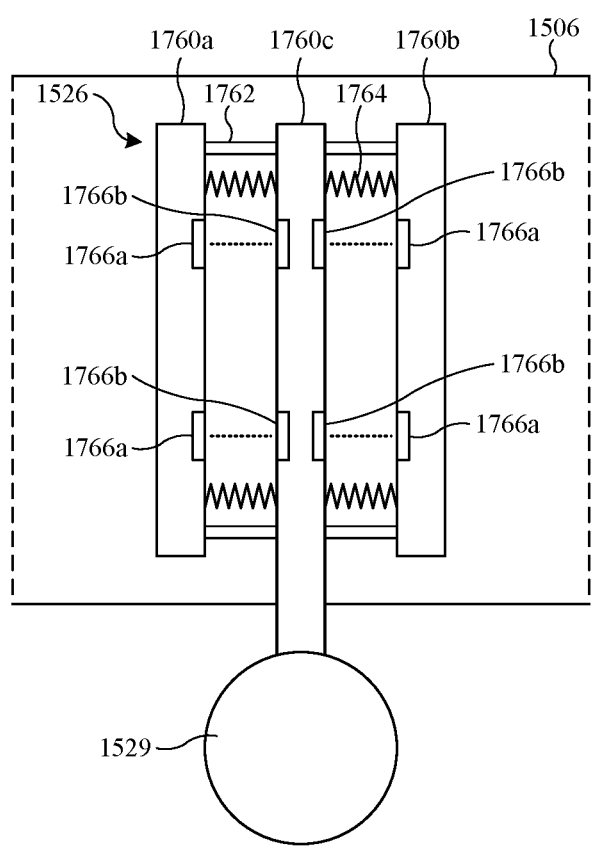
FIG. 17 is a side view detail that shows the headband and the accessory adjustment device in a first position.
Figure 18:
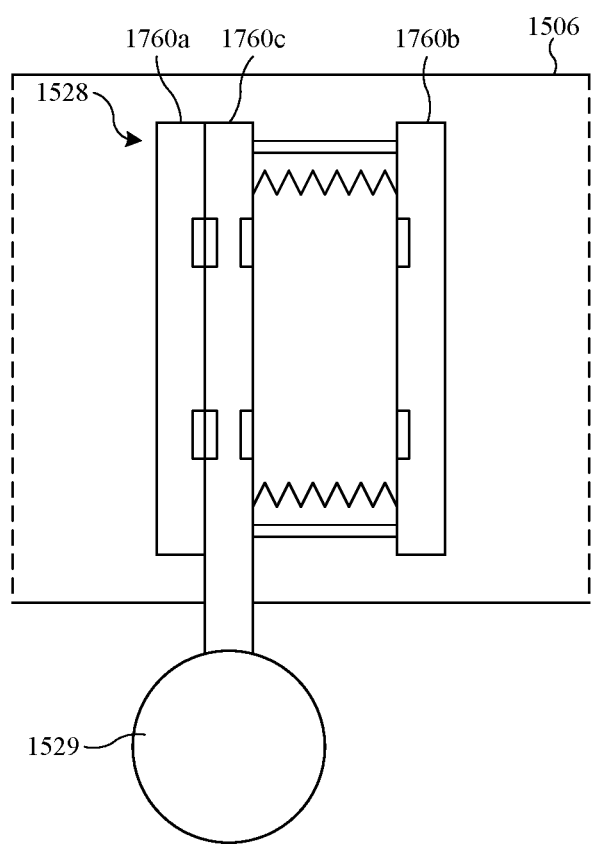
FIG. 18 is a side view detail that shows the headband and the accessory adjustment device in a second position.

FIG. 17 is a side view detail that shows the headband 1506 and the accessory adjustment device 1528 in a first position. FIG. 18 is a side view detail that shows the headband 1506 and the accessory adjustment device 1528 in a second position.

The accessory adjustment device 1528 includes a first end portion 1760*a*, a second end portion 1760*b*, and an adjuster portion 1760*c*. In alternative implementations, the accessory adjustment device 1528 may include two or more of the adjuster portions. The adjuster portion 1760*c* supports the accessory component 1529 with respect to the headband 1506 and is configured to move between the first end portion 1760*a* and the second end portion 1760*b*, which changes the location of the adjuster portion 1760*c* along the length direction of the headband 1506 and also changes the position of the accessory component 1529 along the length direction of the headband 1506.

The first end portion 1760*a* and the second end portion 1760*b* are rigid or semi rigid structures that are connected to the headband 1506 in a fixed manner such that they are not able to move with respect to the headband 1506. The adjuster portion 1760*c* may be a rigid or semi rigid structure that is connected to first end portion 1760*a* and the second end portion 1760*b* such that it is able to move with respect to the first end portion 1760*a*, the second end portion 1760*b* and the headband 1506. As an example, the adjuster portion 1760*c* may move to positions including and between a first position, in which the adjuster portion 1760*c* is adjacent to and/or engaged with the first end portion 1760*a*, and a second position, in which the adjuster portion 1760*c* is adjacent to and/or engaged with the second end portion 1760*b*. Movement of the adjuster portion 1760*c* with respect to the first end portion 1760*a* and the second end portion 1760*b* also moves the adjuster portion 1760*c* with respect to the headband 1506 and with respect to the head of a user when the user is wearing the head-mounted device 1500.

The adjuster portion 1760*c* is connected to the first end portion 1760*a* and the second end portion 1760*b* to allow the adjuster portion 1760*c* to move toward and away from each of the first end portion 1760*a* and the second end portion 1760*b*. As an example, the connecting structures 1762 may be structures such as rods or cables that the adjuster portions are connected to by fixed connections and/or sliding connections. Biasing structures 1764 such as compression springs or tension springs may be placed between the adjuster portion 1760*c* and each of the first end portion 1760*a* and the second end portion 1760*b* to urge the adjuster portion 1760*c* to a neutral position (e.g., centered between the first end portion 1760*a* and the second end portion 1760*b*). In implementations in which there are multiple adjuster portions, the biasing structures 1764 may also be located between adjacent pairs of the adjuster portions.

The adjuster portion 1760*c* is related to the first end portion 1760*a* and the second end portion 1760*b* by electromagnetic devices that that each include an electromagnet 1766*a* and a magnetic component 1766*b*. The magnetic component 1766*b* may be a ferromagnetic structure that may be attracted to and/or repelled by the electromagnet 1766*a*.

In some implementations, the electromagnetic devices are configured such that a repulsive force generated by one of the electromagnets 1766*a* relative to a respective one of the magnetic components 1766*b* is used to move the adjuster portion 1760*c* away from one of the first end portion 1760*a* or the second end portion 1760*b* and toward the other of the first end portion 1760*a* and the second end portion 1760*b*. In some implementations, the electromagnetic devices are configured such that an attractive force generated by one of the electromagnets 1766a relative to a respective one of the magnetic components 1766b is used to move the adjuster portion 1760c toward one of the first end portion 1760a or the second end portion 1760b and away from the other of the first end portion 1760a and the second end portion 1760b.

In the illustrated example, the adjuster portion of the headband adjustment device 1526 is initially in a neutral position by virtue of biasing forces applied by the biasing structures 1764 (FIG. 17). An attractive force is then applied between the first end portion 1760a and the adjustment portion 1760c using one of the electromagnetic devices to move the adjustment portion 1760c toward the first end portion 1760a (FIG. 18). As an example, the adjustment portion 1760c may be moved so that it is adjacent to and/or in engagement with the first end portion 1760a when an attractive force is applied between the first end portion 1760a and the adjustment portion 1760c using one of the electromagnetic devices. Likewise, the adjustment portion 1760c may be moved toward the second end portion 1760b so that it is adjacent to and/or in engagement with the second end portion 1760b when an attractive force is applied between the second end portion 1760b and the adjustment portion 1760c using one of the electromagnetic devices.

Figure 19:
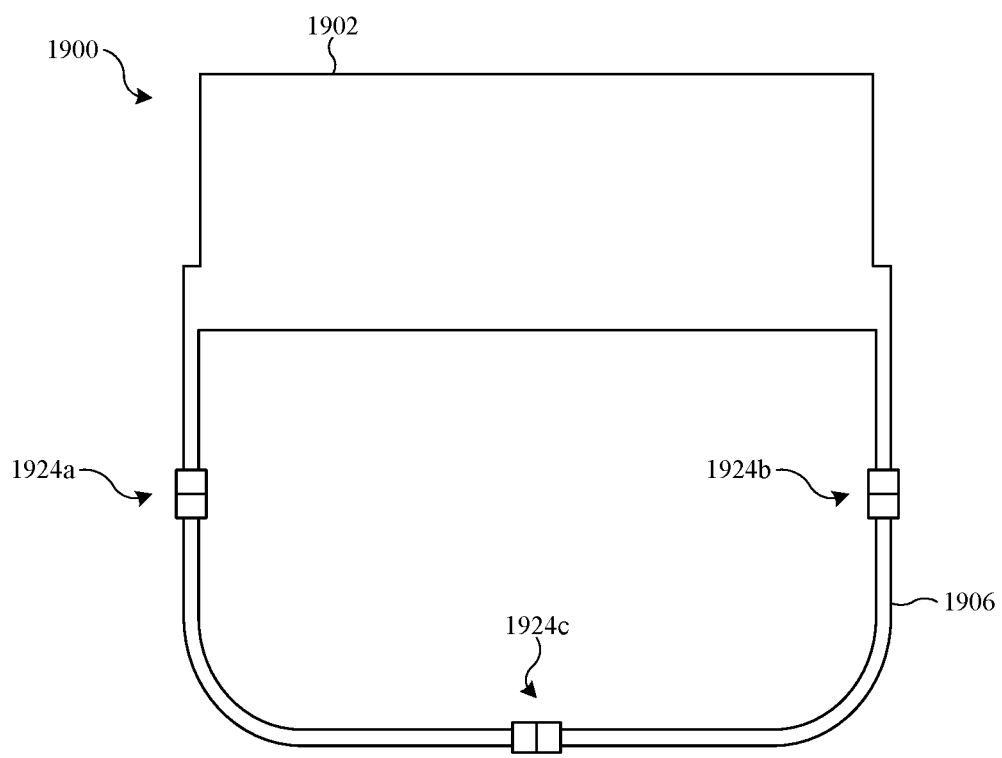
FIG. 19 is a top view illustration that shows a head-mounted device including a headband with multiple headband connectors in a connected position.

FIG. 19 is a top view illustration that shows a head-mounted device 1900 that includes a device housing 1902 and a headband 1906 with multiple headband connectors 1924a, 1924b, 1924c, which are shown in a connected position. The head-mounted device 1900 is similar to the head-mounted device 100 except as otherwise noted, and may include any or all of the components described in connection with the head-mounted device 100. In addition, the headband connectors 1924a, 1924b, 1924c may be added to any other of the head-mounted devices that are described herein.

The headband connectors 1924a, 1924b, and 1924c are each similar to the first headband connector 124 and the second headband connector 125 and can be implemented using the previously described structures to allow each of the headband connectors 1924a, 1924b, 1924c to be moved between connected and disconnected positions. As an example, each of the headband connectors 1924a, 1924b, 1924c may include paired magnetic components that allow first and second parts of each of the headband connectors 1924a, 1924b, 1924c to connect and disconnect. Example of paired magnetic components include paired magnets, a magnet paired with a ferromagnetic part, and an electromagnetic paired with a ferromagnetic part. Thus, the headband connectors 1924a, 1924b, 1924c may each include a first magnetic component on a first part of the headband connector and a second magnetic component on a second part of the headband connector.

Each of the headband connectors 1924a, 1924b, 1924c is connected to a respective portion of the headband 1906, to allow, for example, first and second portions of the headband 1906 to be connected and disconnected with respect to each other.

The locations of the headband connectors 1924a, 1924b, 1924c that are shown in FIG. 9 are example. Headband connectors of the type shown and described with respect to the headband connectors 1924a, 1924b, 1924c can be provided on the headband 1906 in any number and at any location.

In the illustrated example, the headband connector 1924a is positioned on a first lateral side of the headband 1906, the headband connector 1924b is positioned on a right lateral side of the headband 1906, and the headband connector 1924c is positioned at the rear of the headband 1906, approximately in alignment with a lateral midline of the device housing 1902. In one implementation, the headband connectors 1924a, 1924b, 1924c are all included in the head-mounted device 1900 to allow multiple options for connection and disconnection of the headband 1906. In another example, the headband connectors 1924a,1924b on the lateral sides are included and the headband connector 1924c on the rear of the headband 1906 is omitted. In another example, the headband connectors 1924a,1924b on the lateral sides are omitted and the headband connector 1924c allows connection and disconnection of the headband 1906 at the rear of the headband 1906.

In one implementation, one or more of the headband connectors 1924a, 1924b, 1924c is added to the headband 106 of the head-mounted device 100 such that it includes an additional headband connector that is located at an intermediate location along the headband 106.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of a head-mounted device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores information that allows the head-mounted device to be actively adjusted for a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, adjustment parameters may be determined each time the head-mounted device is used, such as by sensing forces applied to parts of the head-mounted device when it is worn by the user, and without subsequently storing the information or associating with the particular user.

What is claimed is:
1. A head-mounted device, comprising:
a device housing;
a display device that is connected to the device housing to display content to a user as emitted light;
an optical system that is configured to direct the emitted light to eyes of the user;
a headband that has a first end and a second end and is configured to support the device housing with respect to the user's head; and
a first headband connector that includes a headband-side connector portion that is connected to the headband at the first end of the headband and a device-side connector portion that is connected to the device housing,
wherein the first headband connector is movable between a disconnected position, in which the headband-side connector portion is disconnected from the device-side connector portion, and a connected position, in which the headband-side connector portion is connected to the device-side connector portion, and
wherein the first headband connector includes paired magnetic components that are configured to attract the headband-side connector portion and the device-side connector portion to one another to urge the first headband connector to move to the connected position.

2. The head-mounted device of claim 1, wherein the paired magnetic components include a permanent magnet and a ferromagnetic structure.

3. The head-mounted device of claim 1, wherein the paired magnetic components include a first permanent magnet that is located on the headband-side connector portion and a second permanent magnet that is located on the device-side connector portion.

4. The head-mounted device of claim 1, wherein the first headband connector includes an electrical power connection.

5. The head-mounted device of claim 1, wherein the first headband connector includes a communications signal connection.

6. The head-mounted device of claim 1, further comprising:
a second headband connector that includes a headband-side connector portion that is connected to the headband at the second end of the headband and a device-side connector portion that is connected to the device housing.

7. The head-mounted device of claim 1, further comprising:
a second headband connector that is directly connected to the device housing and is non-releasable with respect to the device housing.

8. The head-mounted device of claim 1, further comprising:

an additional headband connector that is located along the headband and is movable between a connected position and a disconnected position.

9. The head-mounted device of claim 1, wherein the paired magnetic components include an electromagnet that is operable to generate a magnetic attraction force and application of the magnetic attraction force ceases in response to determining that a current draw by the electromagnet is greater than a threshold value.

10. A head-mounted device, comprising:
a device housing;
a display device that is connected to the device housing to display content to a user as emitted light;
an optical system that is configured to direct the emitted light to eyes of the user;
a headband that has a first end and a second end and is configured to support the device housing with respect to the user's head;
a first headband connector that includes a headband-side connector portion that is connected to the headband at the first end of the headband and a device-side connector portion that is connected to the device housing, wherein the first headband connector includes an electromagnet, the first headband connector is movable between a disconnected position, in which the headband-side connector portion is disconnected from the device-side connector portion, and a connected position, in which the headband-side connector portion is connected to the device-side connector portion; and
a release button that is operable to change operation of the electromagnet to cause the first headband connector to move from the connected position to the disconnected position.

11. The head-mounted device of claim 10, wherein the release button is located on the headband at a location that is spaced from the first headband connector.

12. The head-mounted device of claim 10, further comprising:
a power source that is located on the headband and is operable to supply electrical power to the electromagnet.

13. The head-mounted device of claim 10, wherein the electromagnet is operable to apply a magnetic attraction force to maintain the first headband connector in the connected position.

14. The head-mounted device of claim 13, wherein the release button, when operated by the user, causes the electromagnet to cease application of the magnetic attraction force to cause the first headband connector to move from the connected position to the disconnected position.

15. The head-mounted device of claim 10, wherein the first headband connector includes paired magnetic components that are configured to maintain the first headband connector in the connected position when the electromagnet is not operated and the electromagnet is operable to apply a magnetic repulsion force to move the first headband connector from the connected position to the disconnected position when the electromagnet is operated.

16. The head-mounted device of claim 15, wherein the release button, when operated by the user, causes the electromagnet to apply the magnetic repulsion force to cause the first headband connector to move from the connected position to the disconnected position.

17. A head-mounted device, comprising:
a device housing;
a display device that is connected to the device housing to display content to a user as emitted light;
an optical system that is configured to direct the emitted light to eyes of the user;
a headband that is configured to support the device housing with respect to the user's head; and
a headband adjustment device that is connected to the headband and includes adjuster portions, wherein the headband adjustment device is able to contract and expand a length of the headband by moving the adjuster portions with respect to one another.

18. The head-mounted device of claim 17, wherein the adjuster portions are connected to one another by connecting structures that allow adjacent ones of the adjuster portions to move toward each other and away from each other.

19. The head-mounted device of claim 17, wherein the headband adjustment device includes biasing structures that urge adjacent ones of the adjuster portions to move at least one of toward each other or away from each other.

20. The head-mounted device of claim 17, wherein a first pair of adjuster portions are related to one another by an electromagnetic device that is controllable to cause the first pair of adjuster portions to move at least one of toward each other or away from each other.

21. The head-mounted device of claim 17, further comprising:
a sensor that outputs a signal that represents a magnitude of motion, wherein a magnitude of tension applied to the headband by the headband adjustment device is controlled according to the signal.

22. A head-mounted device, comprising:
a device housing;
a display device that is connected to the device housing to display content to a user as emitted light;
an optical system that is configured to direct the emitted light to eyes of the user;
a headband that is configured to support the device housing with respect to the user's head;
an accessory component; and
an accessory adjustment device that is connected to the headband, supports the accessory component with respect to the headband, and includes a first end portion that is connected to the headband, a second end portion that is connected to the headband, an adjuster portion, and an electromagnetic device, wherein the electromagnetic device is operable to move the adjuster portion between the first end portion and the second end portion to change a location of the accessory component with respect to the headband.

23. The head-mounted device of claim 22, wherein the adjuster portion is connected to the first end portion and the second end portion by connecting structures that allow the adjuster portion to move between the first end portion and the second end portion.

24. The head-mounted device of claim 22, wherein the accessory component is a loudspeaker.

25. A wearable electronic device, comprising:
a device housing;
a support that has a first end and a second end and is configured to secure the device housing with respect to a user; and
a first support connector that includes a support-side connector portion that is connected to the support at the first end of the support and a device-side connector portion that is connected to the device housing, wherein the first support connector is movable between a disconnected position, in which the support-side connector portion is disconnected from the device-side connector portion, and a connected position, in which the support-side connector portion is connected to the device-side connector portion, and wherein the first support connector includes paired magnetic components that are configured to attract the support-side connector portion and the device-side connector portion to one another to urge the first support connector to move to the connected position.

26. The wearable electronic device of claim 25, wherein the paired magnetic components include a permanent magnet and a ferromagnetic structure.

27. The wearable electronic device of claim 25, wherein the paired magnetic components include a first permanent magnet that is located on the headband-side connector portion and a second permanent magnet that is located on the device-side connector portion.

28. The wearable electronic device of claim 25, wherein the paired magnetic components include an electromagnet.

29. The wearable electronic device of claim 28, wherein the electromagnet is operable to generate a magnetic attraction force to maintain the first support connector in the connected position, and application of the magnetic attraction force ceases in response to operation of a release button.

30. The wearable electronic device of claim 28, wherein the electromagnet is operable to generate a repulsion force in response to operation of a release button to cause the first support connector to move from the connected position to the disconnected position.

31. The wearable electronic device of claim 28, wherein the electromagnet is operable to generate a magnetic attraction force and application of the magnetic attraction force ceases in response to determining that a current draw by the electromagnet is greater than a threshold value.

32. The wearable electronic device of claim 25, wherein the first support connector includes an electrical power connection.

33. The wearable electronic device of claim 25, wherein the first support connector includes a communications signal connection.

* * * * *